US012774966B2

(12) United States Patent
Almoneef et al.

(10) Patent No.: US 12,774,966 B2
(45) Date of Patent: Oct. 27, 2026

(54) SPIRAL RESONATOR MATERIAL DETECTOR

(71) Applicant: Prince Sattam Bin Abdulaziz University (PSAU), Al Khuzama (SA)

(72) Inventors: Thamer Almoneef, Al Kharj (SA); Rayed Alyousef, Al Kharj (SA); Muhammad Amin, Madinah (SA); Omar F. Siddiqui, Madinah (SA)

(73) Assignee: Prince Sattam Bin Abdulaziz University (PSAU), Al Kharj (SA)

( * ) Notice: Subject to any disclaimer, the term of this patent is extended or adjusted under 35 U.S.C. 154(b) by 142 days.

(21) Appl. No.: 18/948,256

(22) Filed: Nov. 14, 2024

(65) Prior Publication Data

US 2026/0133139 A1 May 14, 2026

(51) Int. Cl.
*G01N 27/72* (2006.01)
*G01N 22/00* (2006.01)

(52) U.S. Cl.
CPC .................................... *G01N 22/00* (2013.01)

(58) Field of Classification Search
CPC ......... G01N 22/00; H01Q 9/285; H01Q 1/248
See application file for complete search history.

(56) References Cited

U.S. PATENT DOCUMENTS

| | | | | |
|---|---|---|---|---|
| 2003/0071623 A1* | 4/2003 | Marek | G01R 33/34061 | 324/318 |
| 2010/0060388 A1* | 3/2010 | Ueda | H01P 1/203 | 333/236 |
| 2010/0073107 A1* | 3/2010 | Prophet | H01P 1/20381 | 333/204 |
| 2017/0053737 A1* | 2/2017 | Kurs | H01F 27/2823 | |
| 2022/0116037 A1* | 4/2022 | Kain | H03K 17/954 | |
| 2023/0181282 A1* | 6/2023 | Titus | G06K 19/07737 | 235/375 |

FOREIGN PATENT DOCUMENTS

| | | | |
|---|---|---|---|
| CN | 115575720 | * | 1/2023 |
| DE | 2087323 | * | 2/2023 |

* cited by examiner

*Primary Examiner* — Thang X Le
(74) *Attorney, Agent, or Firm* — MUGHAL GAUDRY & FRANKLIN PC

(57) ABSTRACT

An apparatus of a spiral resonator material detector, the apparatus comprising: a planar dielectric substrate; a microstrip transmission line on a first surface of the planar dielectric substrate; a spiral resonator on the first surface of the planar dielectric substrate electrically connected to the microstrip transmission line; and a ground conductor on a second surface of the planar dielectric substrate beneath the microstrip transmission line, wherein the planar dielectric substrate insulates the ground conductor from the microstrip transmission line and the spiral resonator.

14 Claims, 25 Drawing Sheets

1700

SPIRAL RESONATOR MATERIAL DETECTOR

TECHNICAL FIELD

At least one example generally relates to detectors, and more particularly to material and permittivity detectors, employing a spiral resonator, for sensing the permittivity of a sample under test for detecting and characterizing materials.

BACKGROUND

Characterization of material properties is used in a wide range of industries, for example in manufacturing and construction. Materials such as polymers, ceramics, and composites require precise characterization to ensure they meet specific quality standards for performance, reliability, and operational life. Classical material characterization methods are based on destructive tests, which are not only costly and time-consuming but also unsuitable for continuous monitoring applications that may require in-situ monitoring.

The background description provided here is for the purpose of generally presenting the context of the disclosure. Unless otherwise indicated here, the material described in this section is not prior art to the claims in this application and is not admitted to be prior art by inclusion in this section.

BRIEF DESCRIPTION OF THE DRAWINGS

At least one embodiment may be understood more fully from detailed description given below and from accompanying drawings, which, however, should not be taken to be limiting, but are for explanation and understanding.

GLOSSARY OF SYMBOLS

Figure 1:
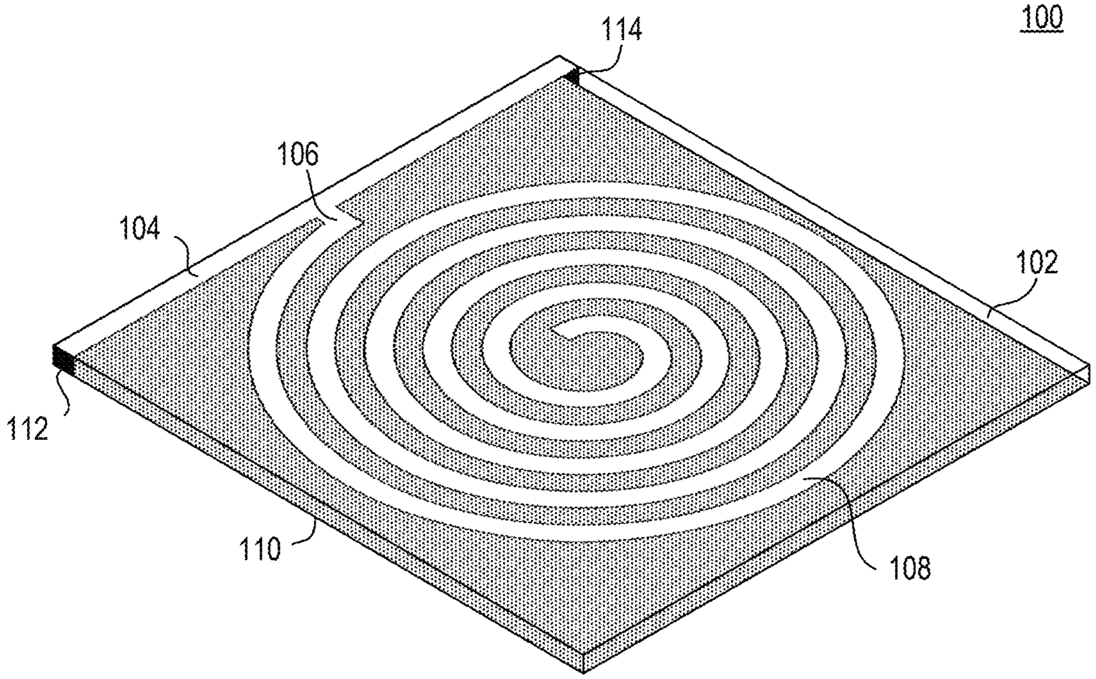
FIG. 1 is a schematic illustrating a spiral resonator structure, in accordance with at least one example.

| | |
|---|---|
| S21 | Transmission scattering parameter. |
| UHF | Ultra-high frequency. |
| $\varepsilon r$ | Relative permittivity. |
| H | Magnetic field intensity. |
| E | Electric field intensity. |
| PCB | Printed circuit board. |

DETAILED DESCRIPTION

Non-destructive characterization methods are becoming popular because they can provide reliable and accurate measurements of material properties without compromising a material's integrity. Permittivity, a critical parameter in material characterization, can be altered by the changing behavior of materials once they are subjected to electric and magnetic fields in various environments. Permittivity values can change with a change in dielectric strength, insulation properties, and overall structure stability. Accurately measuring permittivity, using non-destructive methods, may help in real-time monitoring of the properties of materials in various applications ranging from electronic components to structural materials (e.g., grading concrete in buildings).

The microstrip line-based technological systems, for material characterization, have limitations in terms of sensitivity, accuracy, and ease of deployment. These systems may require stubs of approximately 40 centimeters in length to generate multiple resonance dips within a low-frequency band. The systems can also be complex to manufacture and may not provide a minimum desired resolution for doing accurate characterization of materials.

In the construction industry, the quality and durability of concrete materials can play an important role in the safety and longevity of building infrastructures. The permittivity of a concrete material is a function of its composition, moisture content, and density. All these factors impact the quality and durability of a concrete material. Classical methods of assigning a grade to a concrete material may utilize destructive techniques or indirect measurements that may not represent the true properties of a concrete material.

At least one example is a spiral resonator material detector that provides a non-destructive apparatus for material characterization that may be suited for assessing the type and quality of a material. The distinct spiral geometry of the resonator generates a magnetic dipole, at relatively large resonance frequencies, allowing for a better separation of higher-order resonance dips when a material sample is placed on the spiral resonator material detector. In at least one example, the spiral resonator allows for a compact design, enabling accurate and real-time characterization of a material. Here "detector" and "spiral resonator material detector" are interchangeably used to refer to "spiral resonator material detector."

In at least one example, the spiral resonator material detector comprises one or more spiral resonators that generate stronger magnetic dipole coupling, enhancing resonance response, leading to distinct fields' distribution. The detector is sensitive enough to detect minor variations in the permittivity values of materials, differentiating accurately even between samples of the same material that have subtle differences in permittivity values. Better sensitivity of the spiral structure of various examples leads to an efficient magnetic coupling with the material sample, allowing better signal propagation through the sample.

Ground plane configuration for a spiral resonator material detector can significantly impact the sensitivity of the spiral resonator material detector. When the spiral resonator is equipped with a solid-core ground plane, the magnetic dipole fields are shielded that restricts interaction of the magnetic dipole with the material sample, limiting the resonator's ability to detect slight variations in permittivity values. In contrast, a hollow ground conductor design permits unimpeded magnetic flux continuity leading to high permeability pathways, enabling freer propagation of the dipole fields at greater depths within the material. This unshielded magnetic dipole configuration enhances interaction of the dipole fields with internal structures of the material. Consequently, changes in resonance dips can be accurately measured, leading to a better sensitivity of the material, when different materials are placed on the spiral resonator material detector, offering valuable insights into the material characteristics of the material sample.

Quantifying interaction of dipole fields with internal structures of materials can involve analyzing scattering parameters, for example, the S21 parameter. By observing shifts in both S21 and resonance dips, the spiral resonator material detector can measure precisely the permittivity of a material. Spiral resonator material detector can be used to separate different resonance dips at different resonant frequencies. By placing different materials on the spiral resonator material detector, distinct shift patterns in the S21 scattering parameter can emerge that can be detected by the spiral resonator material detector. The detector's ability to detect frequency shifts, even in the primary (or first) resonance dip, demonstrates its utility in accurately determining material's quality and its intrinsic properties.

Devices based on the spiral resonator material detector can be used for non-destructive testing applications in the construction industry, such as assessing the quality and moisture levels in concrete materials without the need to do expensive invasive sampling. This capability of real-time non-invasive monitoring can ensure structural integrity, leading to better safety standards in construction projects.

The spiral resonator material detector can also be useful in industrial electronics, particularly for characterizing materials in circuit boards and electronic components, where accurately measuring permittivity of a material may be used to enhance the quality of PCB manufacturing processes. The compact design of spiral resonator material detector can lead to an accompanying portable apparatus, allowing inspectors to conduct on-site material evaluations reliably, efficiently, and efficiently.

In at least one example, spiral resonator material detector is used to measure the permittivity of a material placed in the detection range of the spiral resonator material detector. The spiral resonator material detector can be fabricated on a printed circuit board by etching a microstrip transmission line and a spiral resonator on a first surface of a planar dielectric substrate and a ground conductor on a second surface of the planar dielectric surface. By applying a signal to the microstrip transmission line, the spiral resonator resonates at a distinct resonance frequency. The transmission scattering parameter of the spiral resonator material detector changes when the permittivity of a material changes.

In the following description, numerous details are provided as examples of the present disclosure. It will be apparent, however, to one skilled in the art, that examples of the present disclosure may be practiced without these specific details. In other instances, well-known structures and devices are shown in a block diagram form, rather than in detail, to avoid obscuring examples of the present disclosure.

Note that in the corresponding drawings of the examples, curves are represented with lines. Some lines may be thicker or dashed to differentiate between them. Such indications are not intended to be limiting. Rather, the lines are used in connection with one or more examples to facilitate an easier understanding of a plot.

It is pointed out that those elements of the figures having the same reference numbers (or names) as the elements of any other figure can operate or function in any manner like that described but are not limited to such.

FIG. 1 is a schematic illustrating a spiral resonator structure 100, in accordance with at least one example. Spiral resonator structure 100 comprises a planar dielectric substrate 102, a microstrip transmission line 104, a strip 106, a spiral resonator 108, and a ground conductor 110. Microstrip transmission line 104, strip 106, and spiral resonator 108 lie on the top surface of planar dielectric substrate 102, and ground conductor 110 lies on the bottom surface of planar dielectric substrate 102, in accordance with at least one example. Strip 106 electrically connects microstrip transmission line 104 and spiral resonator 108. Ground conductor 110 substantially overlaps microstrip transmission line 104, strip 106, and spiral resonator 108 which acts as an open-ended stub of the spiral resonator structure 100. Strip 106 and spiral resonator 108 are substantially in the middle of microstrip transmission line 104 and radio frequency (RF) port 112 and RF port 114 are placed at the ends of microstrip transmission line 104. When spiral resonator structure 100 is supplied with a RF signal through RF port 112 and RF port 114, spiral resonator structure 100 resonates at multiple resonance frequencies within a designated frequency range.

The specific dimensions and layout of spiral resonator structure 100 elements can match the impedance and enable resonance at one or more specified resonance frequencies. In at least one example, achieving multiple resonance dips within a designated frequency band may require lengthy stubs having a length of approximately 40 centimeters or greater. However, the spiral geometry of spiral resonator 108 of spiral resonator structure 100 helps in generating multiple resonance dips, within a designated frequency band, using a compact spiral resonator structure 100 with a length and width of 5 centimeters×5.2 centimeters. In comparison, the size of resonator structure would be a 5 centimeters×45 centimeters structure if the resonator would have been in the shape of a straight line, extending orthogonal to microstrip transmission line 104, in accordance with at least one example.

Figure 2:
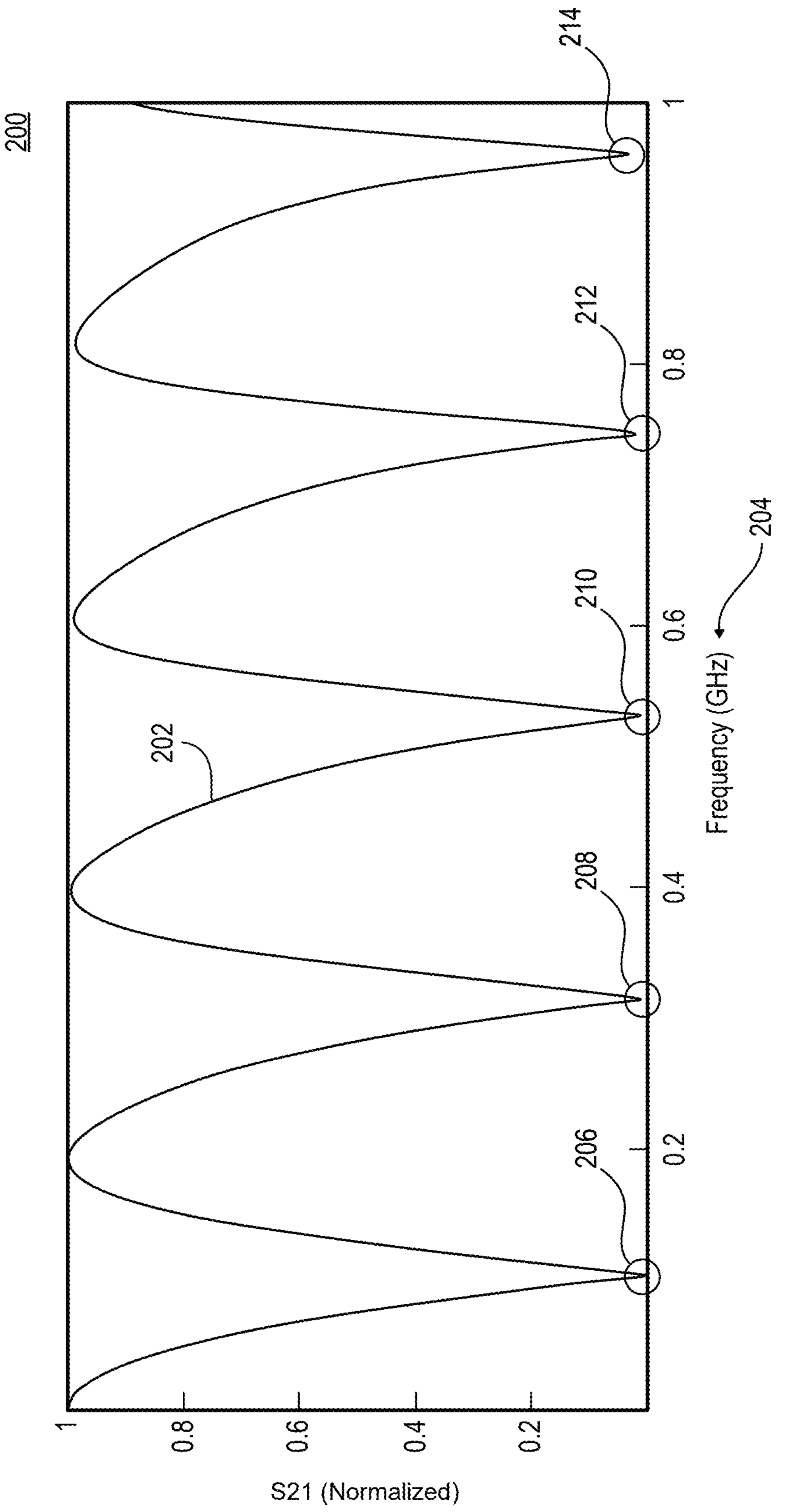
FIG. 2 is a plot of S21 scattering parameter of the spiral resonator structure of FIG. 1, in accordance with at least one example.

FIG. 2 is a plot 200 of a normalized S21 scattering parameter of the spiral resonator structure 100 of FIG. 1, in accordance with at least one example. Normalized S21 scattering parameter curve 202 illustrates the transmission characteristics of the spiral resonator structure 100 within a designated frequency range 204 of 1 MHz to 1 GHz. Plot 200 shows that spiral resonator structure generates five resonance dips: 206, 208, 210, 212, and 214, occurring at specific frequencies of approximately 103 MHz, 315 MHz, 530 MHz, 746 MHz, and 958 MHz, respectively. These low-frequency resonances are less than 1 GHZ (e.g., the ultra-high-frequency (UHF) band), allowing for a wider operational range of the spiral resonator structure 100. Spiral resonator 108, approximately 40 centimeters in length, can generate these multiple resonance dips by extending the electrical length, which supports standing wave patterns at different resonance frequencies. As a result, constructive interference may happen at different resonance frequencies. The spiral geometry of spiral resonator 108 can help generate multiple resonance dips within a low-frequency spectrum because of its compact design.

Figure 3:
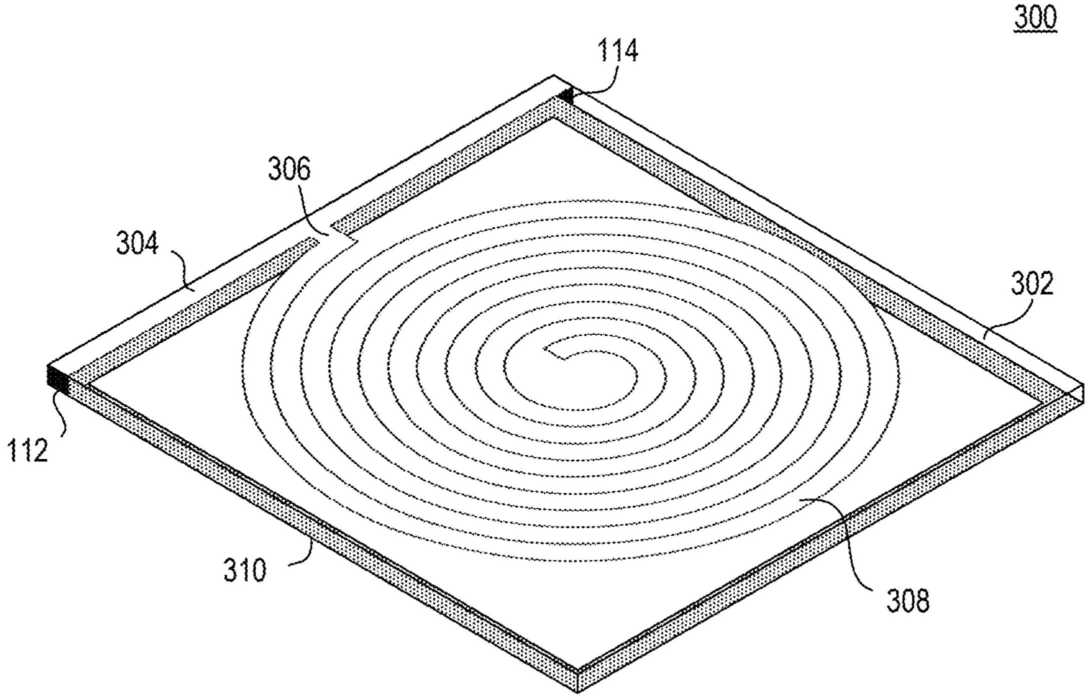
FIG. 3 is a schematic illustrating a spiral resonator material detector, in accordance with at least one example.

FIG. 3 is a schematic illustrating a spiral resonator material detector 300, in accordance with at least one example. Spiral resonator material detector 300 comprises a planar dielectric substrate 302, a microstrip transmission line 304, a strip 306, and a spiral resonator 308, like that of microstrip transmission line 104, strip 106, and spiral resonator 108 of spiral resonator structure 100. Here, spiral resonator material detector 300 has a hollow ground conductor 310 compared to that of solid ground conductor 110 of the spiral resonator structure 100. In at least one example, hollow ground conductor 310 substantially overlaps microstrip transmission line 304, and it also extends around the edges of planar dielectric substrate 302, forming a continuous thin strip. In at least one example, hollow ground conductor 310 leaves the center of spiral resonator 308 exposed, allowing magnetic fields to flow freely on both sides of spiral resonator material detector 300. This design results in a balanced and symmetric distribution of fields around spiral resonator 308, enhancing the interaction between spiral resonator 308 and materials in its nearby ambient environment. By exposing the center of spiral resonator 308, hollow ground conductor 310 may permit stronger magnetic fields on both the top and bottom surfaces of spiral resonator material detector 300, increasing sensitivity to changes in the material properties, such as permittivity.

Figure 4:
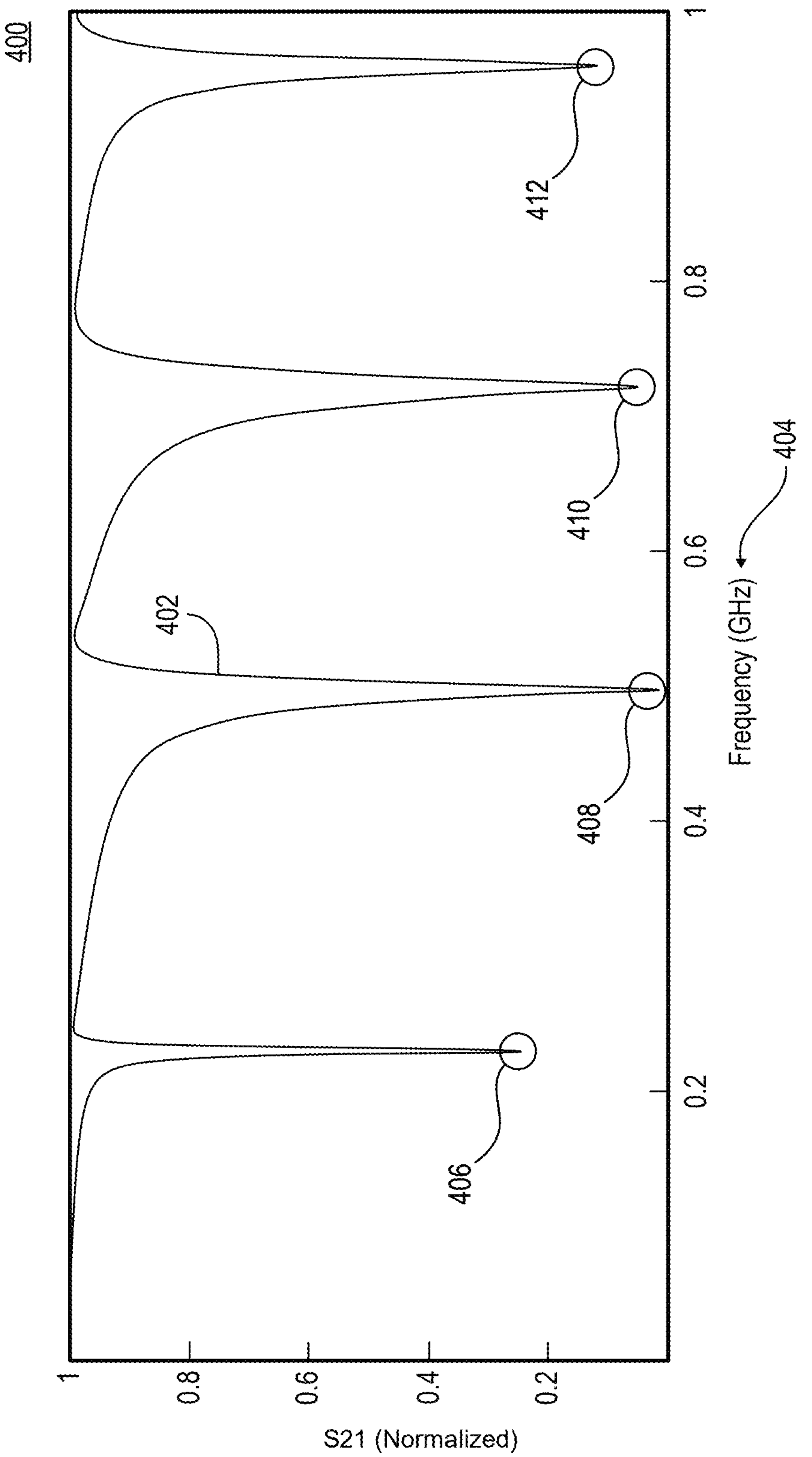
FIG. 4 is a plot of S21 scattering parameter of the spiral resonator material detector of FIG. 3, in accordance with at least one example.

FIG. 4 is a plot 400 of normalized S21 scattering parameter of spiral resonator material detector 300, in accordance with at least one example. Normalized S21 scattering parameter curve 402 illustrates transmission characteristics of spiral resonator material detector 300 within a designated frequency range 404 of 0 to 1 GHz. Plot 400 illustrates that spiral resonator material detector 300 generates four resonance dips 406, 408, 410, and 412, occurring at specific frequencies of approximately 229 MHz, 497 MHz, 721 MHz, and 959 MHz, respectively. These low-frequency resonances are less than 1 GHZ (e.g., the ultra-high-frequency (UHF) band), allowing for a wider operational range of spiral resonator material detector 300. In at least one example, spiral resonator material detector 300 generates four resonance dips 406, 408, 410, and 412 in comparison to spiral resonator structure 100 of FIG. 1, which exhibits five resonance dips 206, 208, 210, 212, and 214 as shown in FIG. 2. Reduction in the number of resonance dips from five, in spiral resonator structure 100, to four in spiral resonator material detector 300 is because of using hollow ground conductor 310. Hollow ground conductor 310 exposes the center of spiral resonator 308, which alters the fields' distribution of spiral resonator material detector 300, forming a magnetic dipole. This magnetic dipole generates fewer resonance dips, as the fields' dynamics get modified because a continuous ground plane is not present underneath the structure of spiral resonator material detector 300.

Figure 5B:
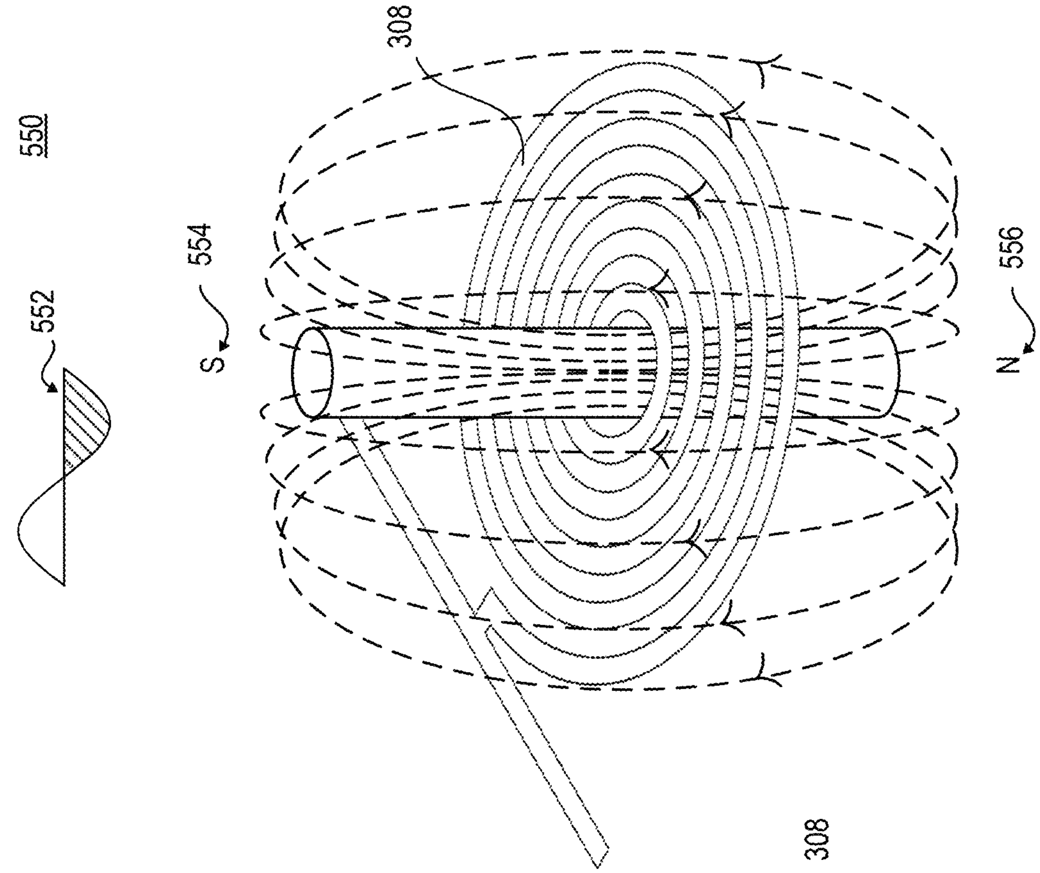
FIG. 5B is a schematic illustrating a field representation of a magnetic dipole induced by circulating electric currents within the spiral resonator material detector of FIG. 3 at a negative half-cycle of an input signal, in accordance with at least one example.
Figure 5A:
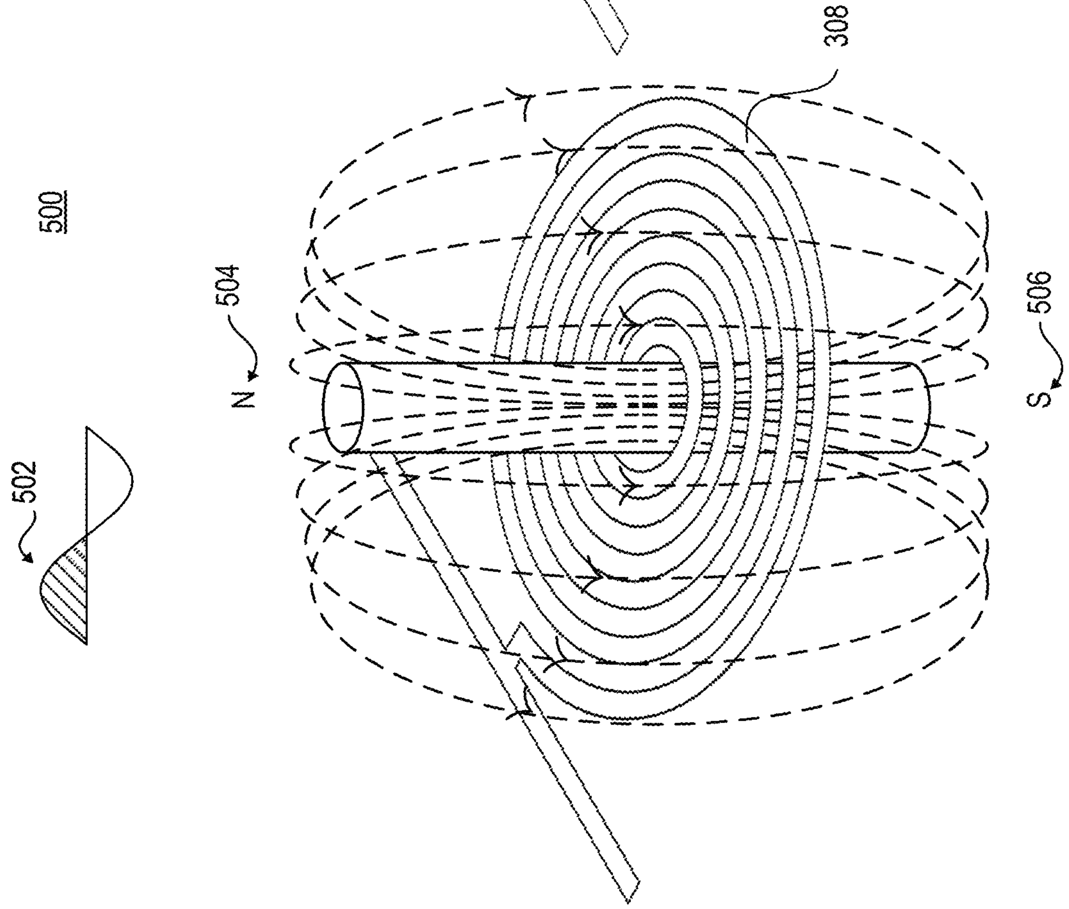
FIG. 5A is a schematic illustrating a field representation of a magnetic dipole induced by circulating electric currents within the spiral resonator material detector of FIG. 3 at a positive half-cycle of an input signal, in accordance with at least one example.

FIG. 5A is a schematic 500 illustrating a field representation of a magnetic dipole induced by circulating electric currents within spiral resonator 308 of FIG. 3 at a positive half-cycle of an input signal, in accordance with at least one example. At a positive half-cycle 502 of an input signal, electric currents circulate within spiral resonator 308 in a counterclockwise direction, thereby inducing a magnetic field in spiral resonator 308. Moreover, the magnetic field lines travel upward from the center of spiral resonator 308, forming a north-pole 504 above spiral resonator 308, and a south-pole 506 is induced below spiral resonator 308, in accordance with at least one example.

FIG. 5B is a schematic 550 illustrating a field representation of a magnetic dipole induced by circulating electric currents within spiral resonator 308 of FIG. 3 at a negative half-cycle of an input signal, in accordance with at least one example. At a negative half-cycle 552 of an input signal, electric currents are reversed, and electric currents circulate within spiral resonator 308 in a clockwise direction, thereby inducing a magnetic field in spiral resonator 308. Moreover, the magnetic field lines travel downward from the center of spiral resonator 308, forming a south-pole 554 above spiral resonator 308, and a north-pole 556 is induced below the spiral resonator 308, in accordance with at least one example.

Figure 6A:
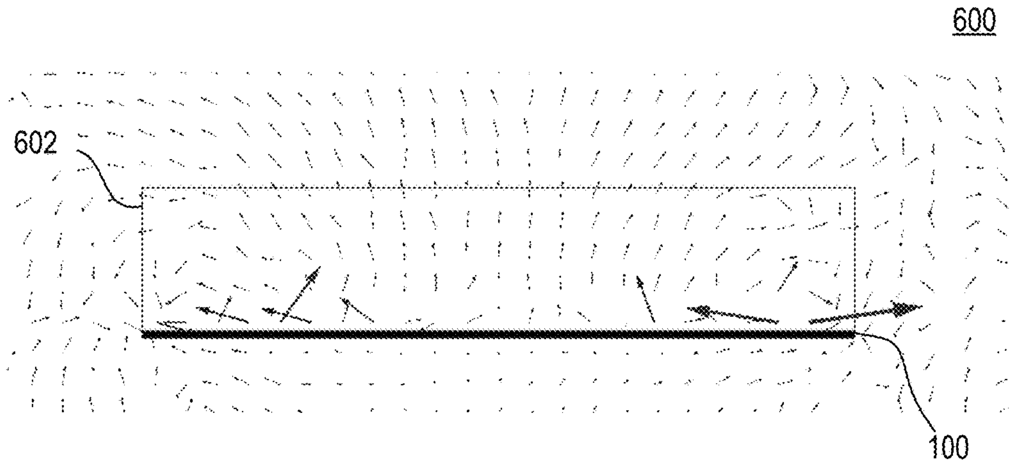
FIG. 6A is a field plot of the spiral resonator structure of FIG. 1, illustrating the distribution of its magnetic field orthogonal to the center of a spiral resonator material detector, in accordance with at least one example.

FIG. 6A is a field plot 600 of a spiral resonator structure 100 of FIG. 1, illustrating the distribution of the magnetic fields orthogonal to the center of a spiral resonator 108, in accordance with at least one example. Field plot 600 illustrates the distribution of magnetic fields across and around spiral resonator 108 at a first resonance frequency of 103 MHz, signifying the role of solid ground conductor 110 of spiral resonator structure 100 on fields' distribution patterns of the magnetic field. In this example, spiral resonator 108 generates fields of 99.7 A/m. Solid ground conductor 110 shields the fields from flowing above and below spiral resonator structure 100. Consequently, the interaction with sample under test 602 is restricted to the magnetic field's fringe areas, minimizing central field penetration.

In at least one example, spiral shape of spiral resonator 108 compresses the resonator structure into a compact structure while shaping the magnetic field into a tightly wound geometry. This results in intensified field regions near the inner turns of spiral resonator structure 100 due to the increased density of currents flowing around the spiral coils of spiral resonator 108. Moreover, the presence of ground plane 110 beneath the structure of spiral resonator structure 100 significantly influences the distribution of overall magnetic field. Ground plane 110 acts as a shield, impeding the transmission of magnetic fields beneath spiral resonator 108, confining it primarily to the region above spiral resonator structure 100. As a result, weak magnetic fields propagate outward and upward from spiral resonator 108.

Figure 6B:
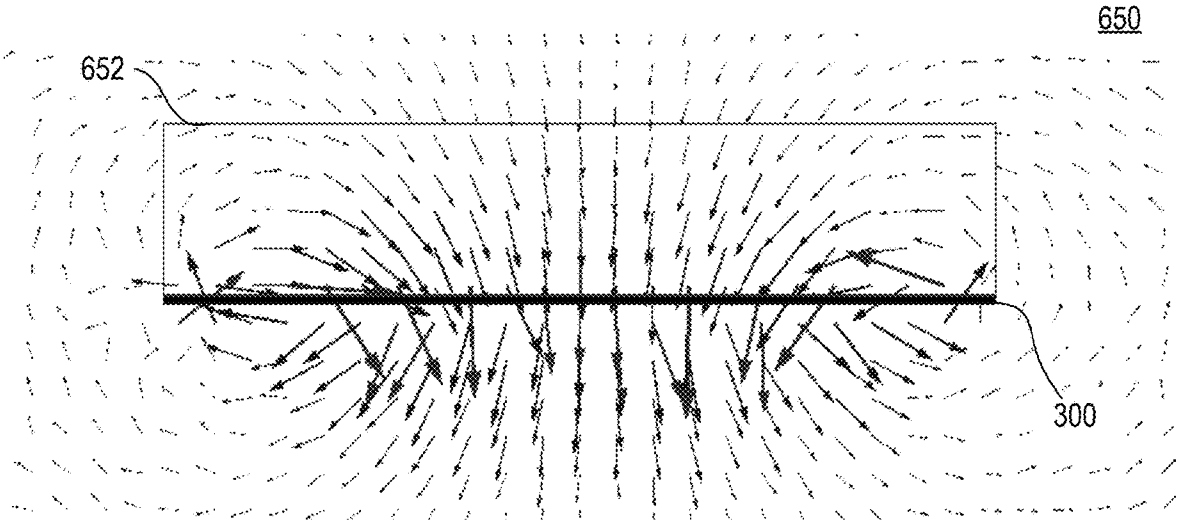
FIG. 6B is a field plot of the spiral resonator material detector of FIG. 3, illustrating the distribution of its magnetic field orthogonal to the center of a spiral resonator material detector, in accordance with at least one example.

FIG. 6B is a field plot 650 of a spiral resonator material detector 300 of FIG. 3, illustrating the distribution of magnetic fields orthogonal to the center of spiral resonator 608, in accordance with at least one example. Field plot 650 illustrates the distribution of magnetic fields across and around spiral resonator material detector 300, signifying the role of spiral geometry of spiral resonator 308 and hollow ground conductor 310 on the fields' distribution patterns. Notably, spiral resonator 308 exhibits a significantly stronger magnetic field intensity, as illustrated in plot 650, compared to that of spiral resonator structure 100. Its strongest magnetic field intensity reaches approximately 519.32 A/m, which is a significant increase from the 99.7 A/m that is achieved by spiral resonator structure 100. This significant increase in the fields' intensity is because of hollow ground conductor 310, allowing the magnetic fields to flow freely in both upward and downward directions compared to solid ground conductor 110 of spiral resonator structure 100. By exposing the center of spiral resonator 308, hollow ground conductor 310 helps in freer propagation of magnetic fields above and below spiral resonator material detector 300, resulting in a symmetric field distribution.

In contrast to spiral resonator structure 100, where solid ground conductor 110 restricts the magnetic fields, hollow ground conductor 310 in spiral resonator material detector 300 exhibits a magnetic dipole when electric currents travel through the spiral, enabling magnetic fields to propagate in both directions above and below spiral resonator material detector 300. As a result, spiral resonator material detector 300 can better sense changes in its ambient environment. Hollow ground conductor 310 provides the benefit of having stronger magnetic fields that can improve the sensitivity of spiral resonator material detector 300, making it better suited for detecting material properties such as permittivity of sample under test 652, in accordance with at least one example.

Figure 7:
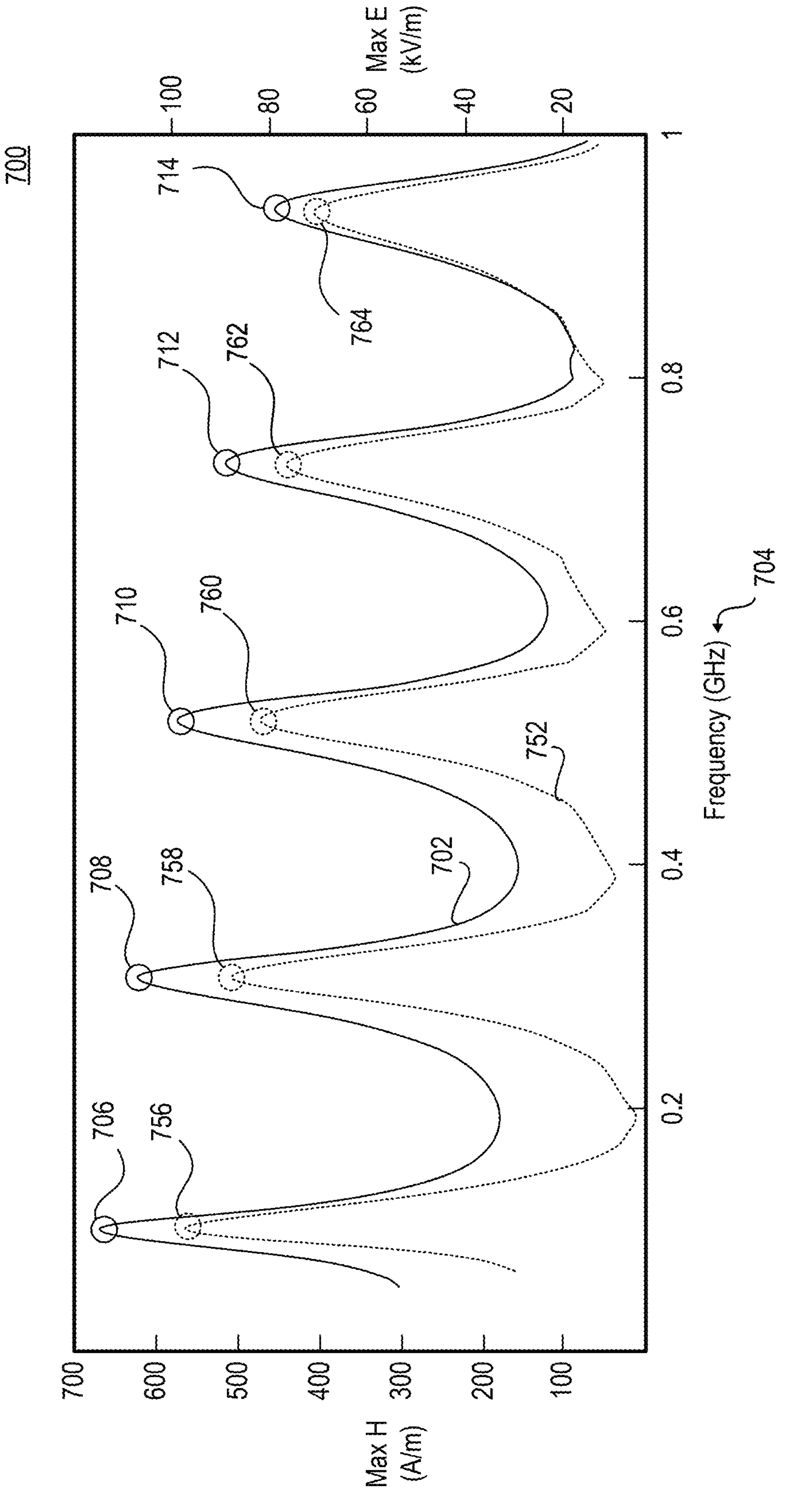
FIG. 7 is a combined plot of maximum intensity of magnetic and electric fields at the surface of the spiral resonator structure of FIG. 1 across a frequency range of 0.06 GHz to 0.98 GHz, in accordance with at least one example.

FIG. 7 is a combined plot of maximum magnetic and electric field intensities at the surface of a spiral resonator structure 100 within a designated frequency range 704 of 0.06 GHz to 0.98 GHz, in accordance with at least one example. Curve 702 illustrates the intensity of magnetic fields of spiral resonator structure 100, wherein curve 702 includes five peaks 706, 708, 710, 712, and 714. Peak 706 exhibits a field intensity of 668.97 A/m at a frequency of 100.9 MHz, and peak 708 exhibits a field intensity of 621.29 A/m at a frequency of 308.7 MHz. Similarly, peak 710 exhibits a field intensity of 573.05 A/m at a frequency of 518.5 MHz, and peak 712 exhibits a field intensity of 514.94 A/m at a frequency of 728.3 MHz. Finally, peak 714 exhibits a field intensity of 453.61 A/m at a frequency of 936.1 MHz. Similarly, curve 752 illustrates the intensity of electric fields at the surface of spiral resonator structure 100, wherein curve 752 illustrates five peaks 756, 758, 760, 762, and 764. Peak 756 exhibits a field intensity of 97.37 kV/m at a frequency of 100.9 MHz, and peak 758 exhibits a field intensity of 87.68 kV/m at a frequency of 306.7 MHz. Similarly, peak 760 exhibits a field intensity of 81.99 kV/m at a frequency of 516.5 MHz, and peak 762 exhibits a field intensity of 76.64 kV/m at a frequency of 726.3 MHz. Finally, peak 764 exhibits a field intensity of 70.86 kV/m at a frequency of 932.1 MHz. These peaks correspond to the resonance frequencies of spiral resonator structure 100, as the patterns of maximum magnetic and electric field intensities (curve 702 and 752) are closely correlated at the resonance frequencies of spiral resonator structure 100. This pattern is observed at the resonance phenomenon because the distribution of currents flowing within the structure of spiral resonator 108 reaches its maximum, resulting in strong magnetic and electric fields.

In at least one example, as the frequency of resonance increases, the intensity of magnetic fields gradually decreases as illustrated by peaks 706, 708, 710, 712, and 714, respectively. The decrease in the intensity of the magnetic fields at relatively higher resonance frequencies results because of two factors: (1) energy dissipation, and (2) increase in impedance within spiral resonator structure 100. At higher resonance frequencies, the electrical length of spiral resonator 108 becomes relatively shorter in terms of its wavelength, leading to an inefficient energy storage because of decaying current density along the surface of spiral resonator structure 100. Additionally, parasitic losses such as resistive losses and radiative losses become significantly pronounced at higher frequencies, resulting in reducing the peak intensity of magnetic fields. Despite a decreasing trend in the intensity of magnetic fields, the presence of multiple fields indicates that spiral resonator structure 100 can support multiple resonance dips across the complete ultra-high frequency (UHF) band, exhibiting a stronger performance in a designated frequency band of less than 1 GHZ.

In at least one example, the intensity of electric fields, shown by curve 752, gradually decreases with a gradual increase in the frequency 704, and peak 756 represents the maximum intensity of 97.37 kV/m at 100.9 MHz. One reason for a gradual decrease in the intensity of electric fields with an increase in the frequency is because of shorter current paths, which limit the ability of spiral resonator structure 100 to sustain high intensity electric fields at higher resonance dips. The variations in the peak electric field intensity, within a designated frequency band, are a result of changing distribution of charges on the structure of spiral resonator 108 at each resonance dip. Spiral resonator structure 100 keeps generating high intensity electric fields, and the last peak of 70.86 kV/m is observed at 932.1 MHz. This shows that spiral resonator structure 100 can effectively maintain its performance across the complete UHF band, with the spiral structure of spiral resonator 108 influencing both the distribution and intensity of the electric fields, in accordance with at least one example.

Figure 8:
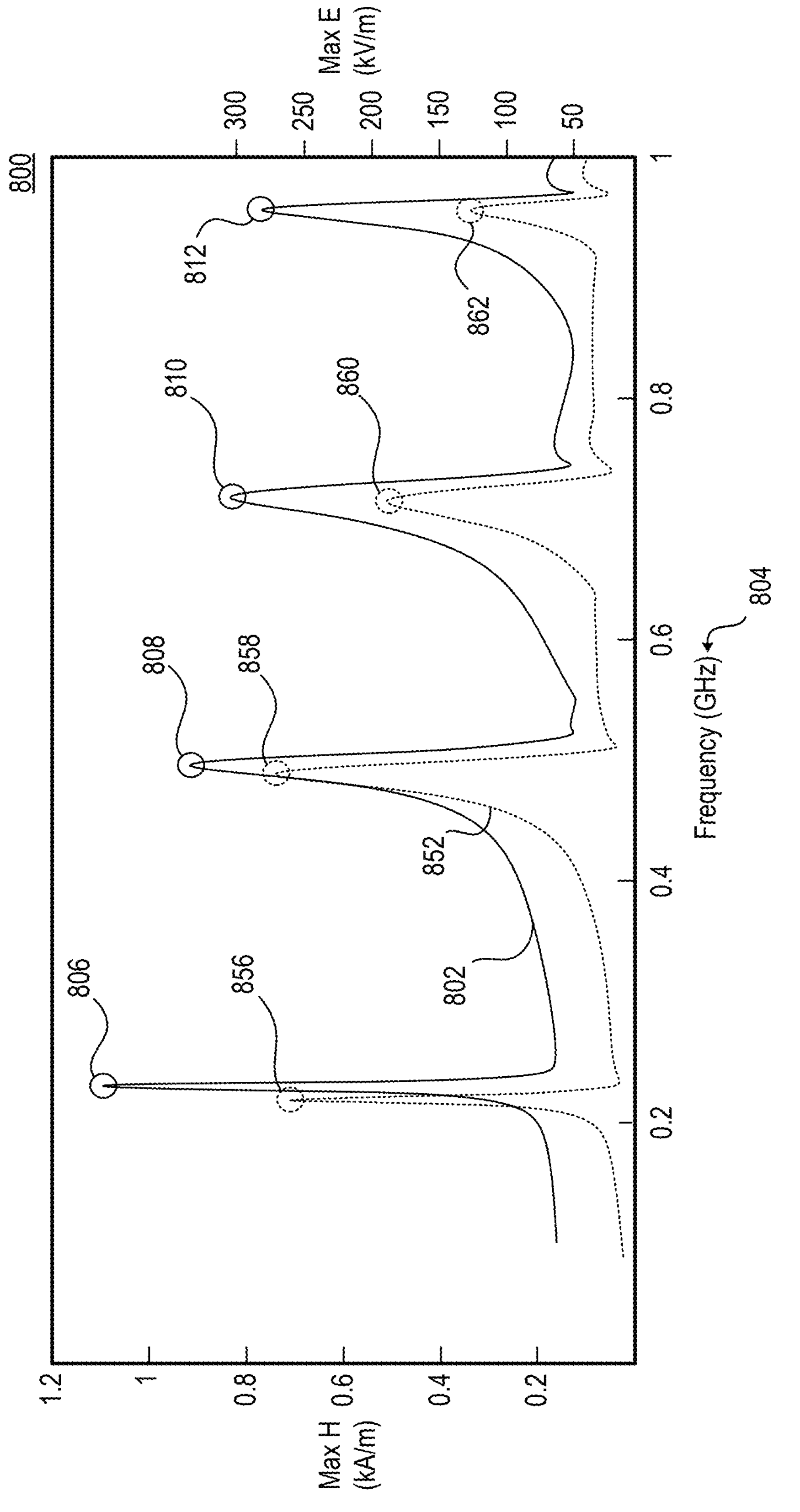
FIG. 8 is a combined plot of maximum magnetic intensity of electric field intensity at the surface of the spiral resonator material detector of FIG. 3 across a frequency range of 0.1 GHz to 1 GHz, in accordance with at least one example.

FIG. 8 is a plot 800 of maximum intensities of magnetic and electric fields at the surface of spiral resonator material detector 300 across a designated frequency range 804 of 0.1 GHz to 1 GHz, in accordance with at least one example. Curve 802 illustrates the intensity of magnetic fields at the surface of spiral resonator material detector 300. Curve 802 shows four intensity peaks 806, 808, 810, and 812, respectively. Peak 806 exhibits a magnetic field intensity of 1.098 kA/m at a frequency of 229 MHz, and peak 808 exhibits a magnetic field intensity of 0.911 kA/m at a frequency of 495 MHz. Similarly, peak 810 exhibits a magnetic field intensity of 0.833 kA/m at a frequency of 719 MHz, and finally, peak 812 exhibits a magnetic field intensity of 0.767 kA/m at a frequency of 957 MHz. Curve 852 illustrates the intensity of electric fields at the surface of spiral resonator material detector 300. Curve 852 shows four intensity peaks 856, 858, 860, and 862, respectively. Peak 856 exhibits an electric field intensity of 252.33 kV/m at a frequency of 229 MHz, and peak 858 exhibits an electric field intensity of 263.34 kV/m at a frequency of 497 MHz. Similarly, peak 860 exhibits an electric field intensity of 181.72 kV/m at a frequency of 719 MHz, and peak 862 exhibits an electric field intensity of 119.92 kV/m at a frequency of 957 MHz. These peaks 806, 808, 810, and 812 correspond to the resonance frequencies of spiral resonator material detector 300, as the maximum intensity of magnetic and electric fields, shown in curve 802 and 852, respectively, align with the resonance frequencies of spiral resonator material detector 300. At the resonance frequency, the current distribution is maximum along spiral resonator 308, leading to intensified magnetic and electric fields around spiral resonator material detector 300. In at least one example, spiral resonator material detector 300 exhibits fewer resonance peaks (four instead of five), but higher field intensity because of hollow ground conductor 310, compared to that of spiral resonator structure 100.

In at least one example, intensity peaks 806, 808, 810, and 812 of magnetic fields, showing the intensity of magnetic fields at designated frequencies, may gradually decrease with an increase in the frequency. The reason for this behavior is that parasitic losses, including resistive and radiative losses, are significantly higher at higher resonance frequencies. Moreover, at higher frequencies, the electrical length of spiral resonator 308 decreases in terms of its wavelength, leading to less efficient energy storage, leading to a reduced current density. Despite these factors, spiral resonator material detector 300 can support multiple resonance dips within the complete UHF band, maintaining strong performance in a designated frequency band 804, in accordance with at least one example. The intensity of magnetic fields is also significantly higher in spiral resonator material detector 300 compared with the ones of spiral resonator structure 100. Even the lowest intensity of 767 A/m of the magnetic fields, shown by peak 812, is significantly higher than the highest intensity of 668.97 A/m of the magnetic fields, shown by peak 706.

In at least one example, spiral resonator 308 generates standing wave patterns that concentrate charge, creating localized regions with higher intensity electric fields, at the resonance frequencies. The intensity of electric fields exhibits somewhat irregular patterns in a designated frequency range compared to that of the magnetic fields. For example, the second intensity peak 858 of 263.34 kV/m is observed at 497 MHz, while the second intensity peak 808 of 911 A/m is observed at 495 MHz. This difference in intensity of electric and magnetic fields is because of presence of hollow ground conductor 310 that allows transmission of electric fields both above and below spiral resonator 308, which significantly alters the distribution of charges, leading to an increase in the intensity of electric fields at designated resonance frequencies. As the resonance frequency increases, intensity peaks of electric fields, shown by peaks 856, 858, 860, and 862, respectively, show a decreasing trend with the lowest intensity peak 862 of 119.92 kV/m occurring at 957 MHz. This behavior is attributable to shorter current paths and less energy storage at higher resonance frequencies. Even then, spiral resonator material detector 300 can generate high intensity significant electric fields across the entire UHF band. Hollow ground conductor 310 can influence the distribution of electric fields in the ambient environment of spiral resonator material detector 300, enabling material detection with a higher accuracy, in accordance with at least one example.

Figure 9A:
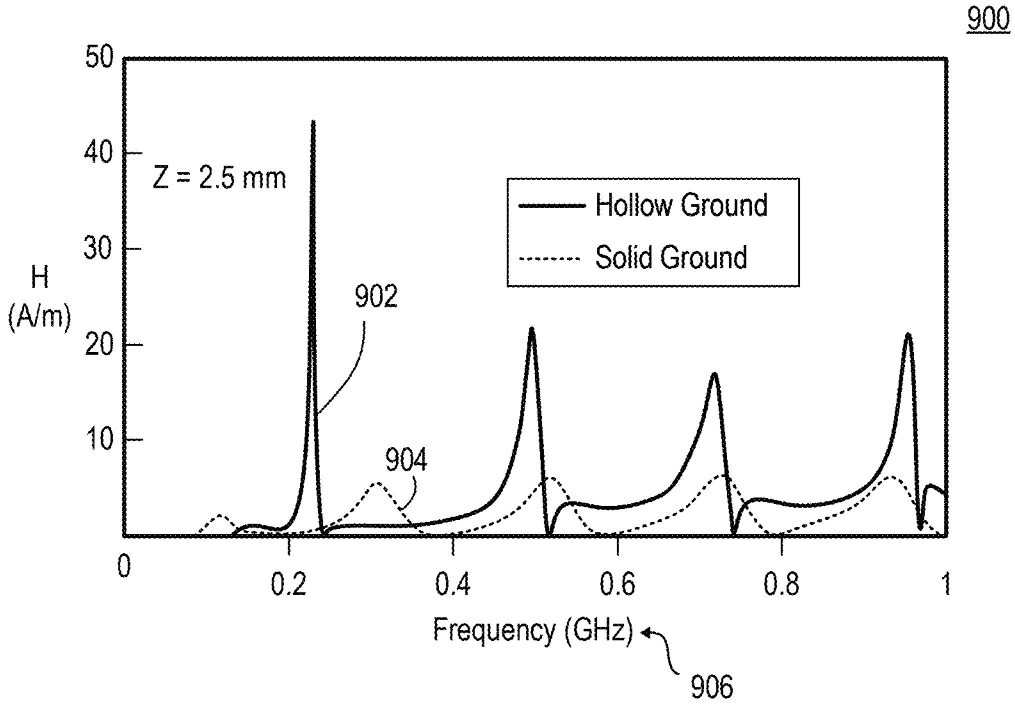
FIG. 9A is a plot of magnetic field intensity of spiral resonator structure and spiral resonator metal detector of FIG. 1 and FIG. 3 respectively, at a distance of 2.5 millimeters above the spiral resonator, in accordance with at least one example.

FIG. 9A is a plot 900 of magnetic field intensity of spiral resonator structure 100 and spiral resonator material detector 300 of FIG. 1 and FIG. 3 respectively, at a distance of 2.5 millimeters above spiral resonator 108 and spiral resonator 308, in accordance with at least one example. Plot 900 includes magnetic field intensity curves 902 and 904. Curve 902 represents the magnetic field intensity of spiral resonator 308 of spiral resonator material detector 300 of FIG. 3, while curve 904 represents the magnetic field intensity of spiral resonator 108 of spiral resonator structure 100 of FIG. 1, measured across the frequency band 906. The peaks of magnetic field intensity curve occur at the respective resonance frequencies. Curve 902 illustrates that the field intensity of spiral resonator material detector 300 is greater compared to that of spiral resonator structure 100.

Figure 9B:
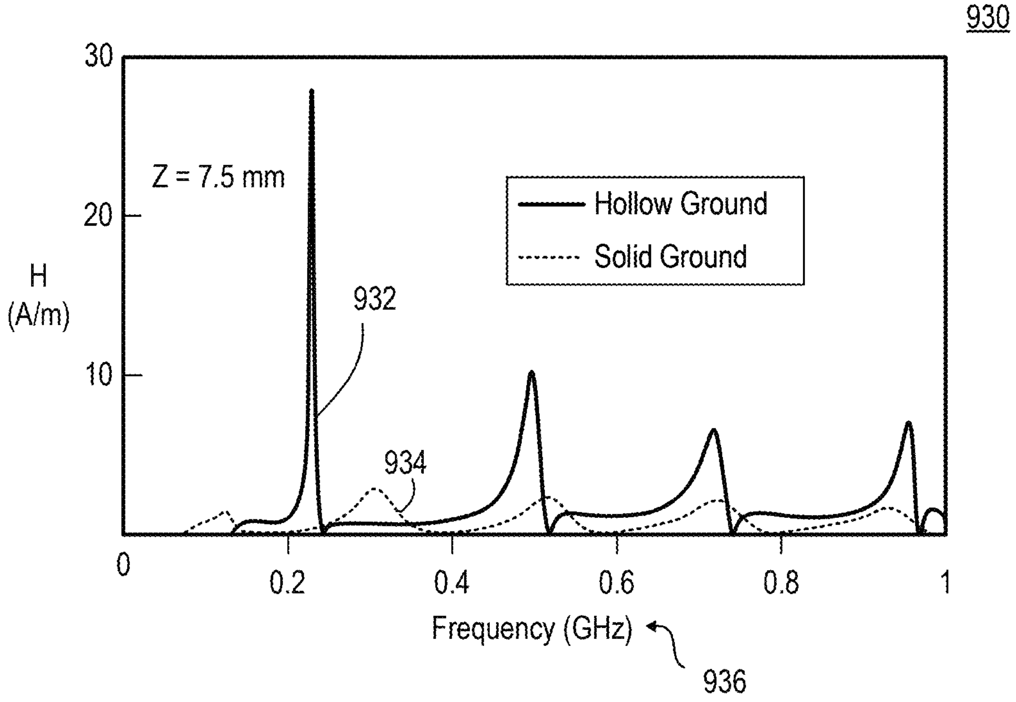
FIG. 9B is a plot of magnetic field intensity of spiral resonator structure and spiral resonator metal detector of FIG. 1 and FIG. 3 respectively, at a distance of 7.5 millimeters above the spiral resonator, in accordance with at least one example.

FIG. 9B is a plot 930 of magnetic field intensity of spiral resonator structure 100 and spiral resonator material detector 300 of FIG. 1 and FIG. 3 respectively, at a distance of 7.5 millimeters above spiral resonator 108 and spiral resonator 308, in accordance with at least one example. Plot 930 includes magnetic field intensity curves 932 and 934, where curve 932 corresponds to the magnetic field intensity of spiral resonator 308 of spiral resonator material detector 300, and curve 934 represents the magnetic field intensity of spiral resonator 108 of spiral resonator structure 100, measured across the frequency band 936. As observed in FIG. 9A, the field intensity of spiral resonator material detector 300 is greater compared to that of spiral resonator structure 100.

Figure 9C:
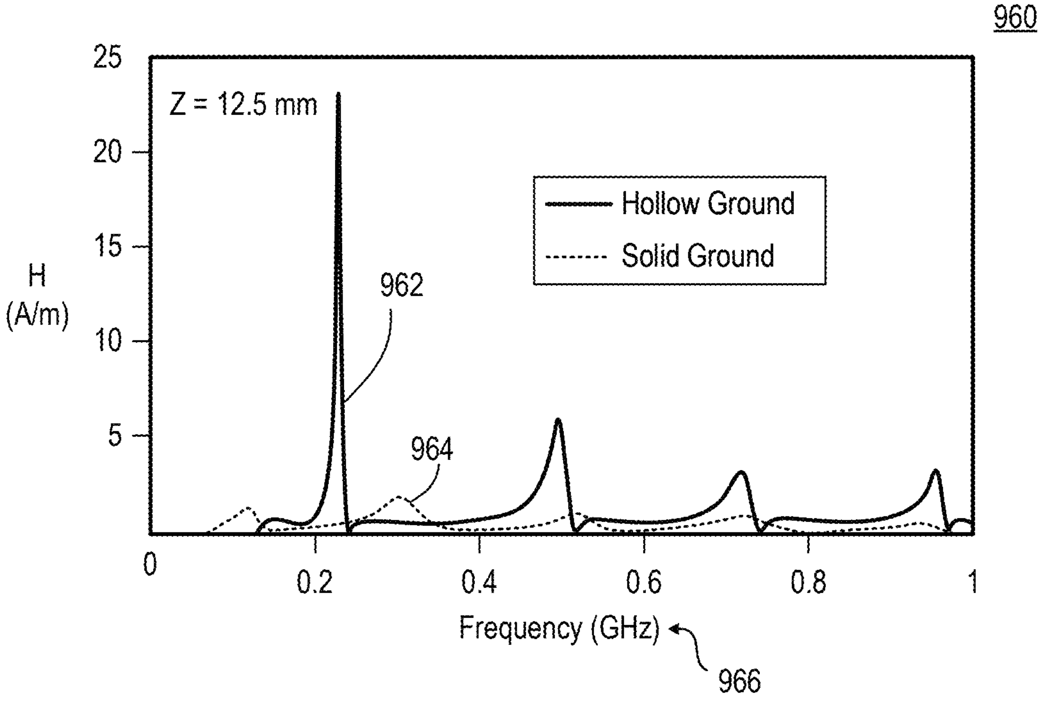
FIG. 9C is a plot of magnetic field intensity of spiral resonator structure and spiral resonator metal detector of FIG. 1 and FIG. 3, respectively, at a distance of 12.5 millimeters above the spiral resonator, in accordance with at least one example.

FIG. 9C is a plot 960 of magnetic field intensity of spiral resonator structure 100 and spiral resonator material detector 300 of FIG. 1 and FIG. 3, respectively, at a distance of 12.5 millimeters above spiral resonator 108 and spiral resonator 308, in accordance with at least one example. Plot 960 includes magnetic field intensity curves 962 and 964, where curve 962 indicates the magnetic field intensity of spiral resonator 308 of spiral resonator material detector 300, while curve 964 represents the magnetic field intensity of spiral resonator 108 of spiral resonator structure 100, measured across the frequency band 966. As with the previous examples, curve 962 shows the field intensity of spiral resonator material detector 300 is greater compared to that of spiral resonator structure 100.

Collectively, plots 900, 930, and 960 of FIG. 9A, FIG. 9B, and FIG. 9C, respectively, illustrate that the magnetic field intensity is consistently stronger for spiral resonator material detector 300, with a hollow ground conductor, across various distances as seen in curves 902, 932, and 962. This enhanced field intensity, in comparison to spiral resonator structure 100 having a solid ground conductor (curves 904, 934, and 964) indicates that the hollow ground conductor allows for deeper magnetic field penetration through internal structures of a sample under test, leading to an increased sensitivity for material characterization. The plots show that spiral resonator detector 300 can accurately and reliably characterize materials compared to that of spiral resonator structure 100 across all frequency bands 906, 936, and 966.

Figure 10:
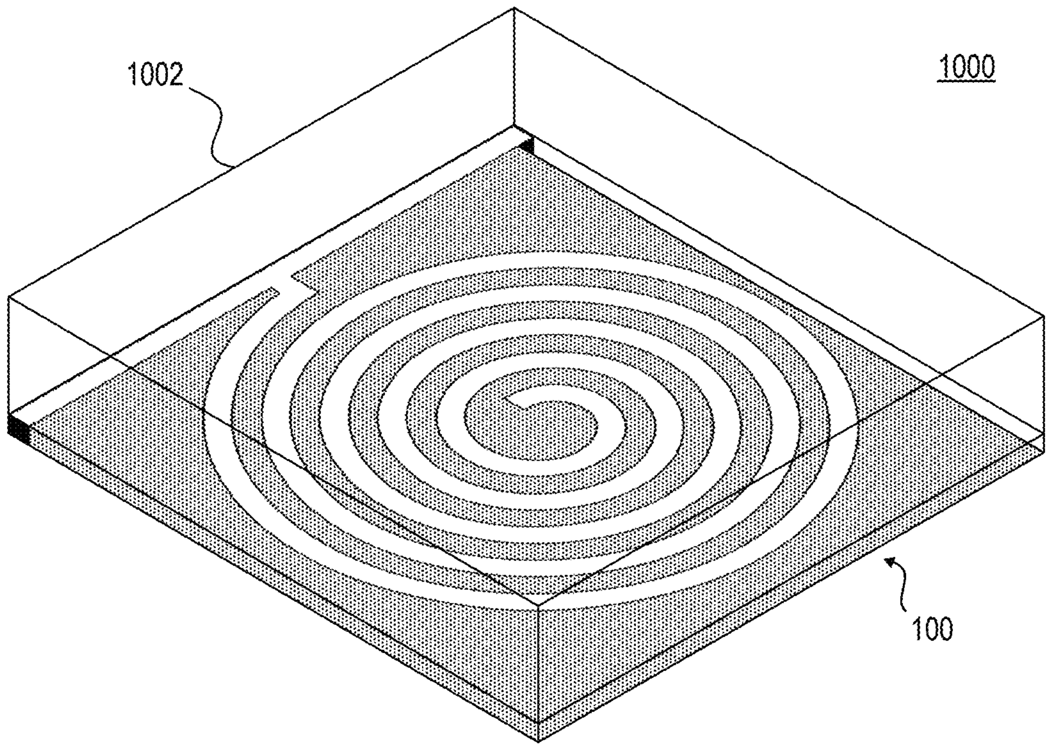
FIG. 10 is a schematic illustrating a simulation setup with a sample under test (SUT) placed on the spiral resonator structure of FIG. 1, in accordance with at least one example.

FIG. 10 is a schematic illustrating an apparatus 1000 in which a block of a sample under test 1002 is placed on top of a spiral resonator structure 100 of FIG. 1, in accordance with at least one example. Spiral resonator structure 100 can generate multiple resonance frequencies within a designated frequency band of 1 MHz to 1 GHz and may detect even smaller variations in the material properties, such as permittivity value of sample under test 1002. This behavior of spiral resonator structure 100 is a result of its sensitivity to changes in the dielectric properties of nearby materials, which enables interaction of electric and magnetic fields of spiral resonator 108 and the sample under test 1002. In at least one example, sample under test 1002 is of the same width and length as that of spiral resonator structure 100 (e.g., 5×5.2 centimeters and has a height of 3 centimeters). Apparatus 1000 is sensitive enough to detect changes in the permittivity value of sample under test 1002, which consequently changes the resonances frequencies of spiral resonator structure 100. Multiple resonance dips generated by spiral resonator structure 100 enable it to detect a wide range of permittivity values, as individual resonance dip responds to changes in the dielectric properties of sample under test 1002. As the material of sample under test 1002 changes, the permittivity of sample under test 1002 increases or decreases, and the permittivity as observed by spiral resonator structure 100 also changes. Consequently, this phenomenon shifts S21 scattering parameters across different resonance peaks. This shift in resonance frequencies can be used to determine the permittivity value of sample under test 1002 using a lookup table, making apparatus 1000 suitable for applications that desire precise material characterization, such as in non-destructive grading of concrete in buildings.

Figure 11:
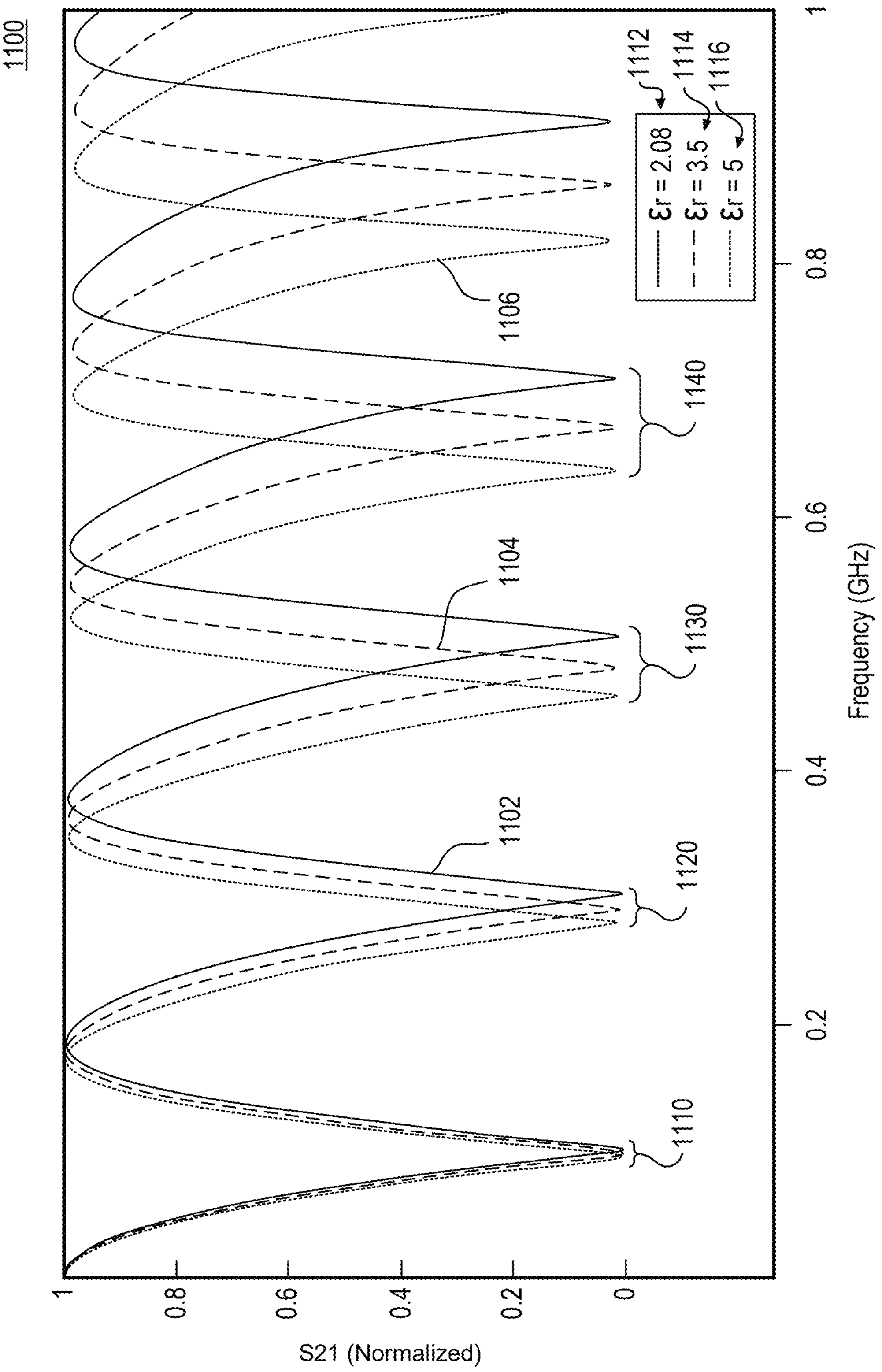
FIG. 11 is a plot of S21 scattering parameter of the spiral resonator structure of FIG. 1, illustrating variations in the scattering parameter once different materials are placed as sample under test in the simulation setup of FIG. 10, in accordance with at least one example.

FIG. 11 is a plot 1100 of normalized S21 scattering parameter of spiral resonator structure 100 showing the effect of placing a sample under test 1002 on the resonance behavior, in accordance with at least one example. Plot 1100 shows three curves 1102, 1104, and 1106 corresponding to different permittivity values of sample under test 1002. Curve 1102 corresponds to a material permittivity value 1112 of 2.08, curve 1104 corresponds to a permittivity value 1114 of 3.5, and curve 1106 corresponds to a permittivity value 1116 of 5. As different material is used for sample under test 1002, the permittivity value is increases from 2.08 to 5, an individual curve gradually shifts to the left, indicating a shift in resonance frequencies within each resonance dip. Plot 1100 illustrates that when a material with a higher permittivity value compared to the previous material is placed as sample under test 1002, individual resonance dip of spiral resonator structure 100 also shifts to the left. The first resonance dip shift 1110 is relatively small, indicating less sensitivity to changes in permittivity values at this resonance frequency. In comparison, the second resonance dip shift 1120 is more recognizable, showing a better sensitivity to differentiate material with a higher permittivity value from the ones with lower material with higher permittivity values. The third resonance dip shift 1130 exhibits a significantly greater shift compared to those of the first two resonance dips, demonstrating that higher resonance dips are more sensitive to changes in the material properties and characteristics of sample under test 1002. This behavior is even more pronounced in the fourth resonance dip shift 1140. In at least one example, this behavior highlights the capability of spiral resonator structure 100 to detect even subtle changes in material properties when higher resonance frequencies exhibit larger shifts in response to variations in the permittivity values of materials. The large shifts of various resonance dips can enable spiral resonator structure 100 to measure the resonance frequency at which the resonance dips occur and then determine permittivity values of a set of materials, enabling characterization of materials by spiral resonator structure 100.

Figure 12:
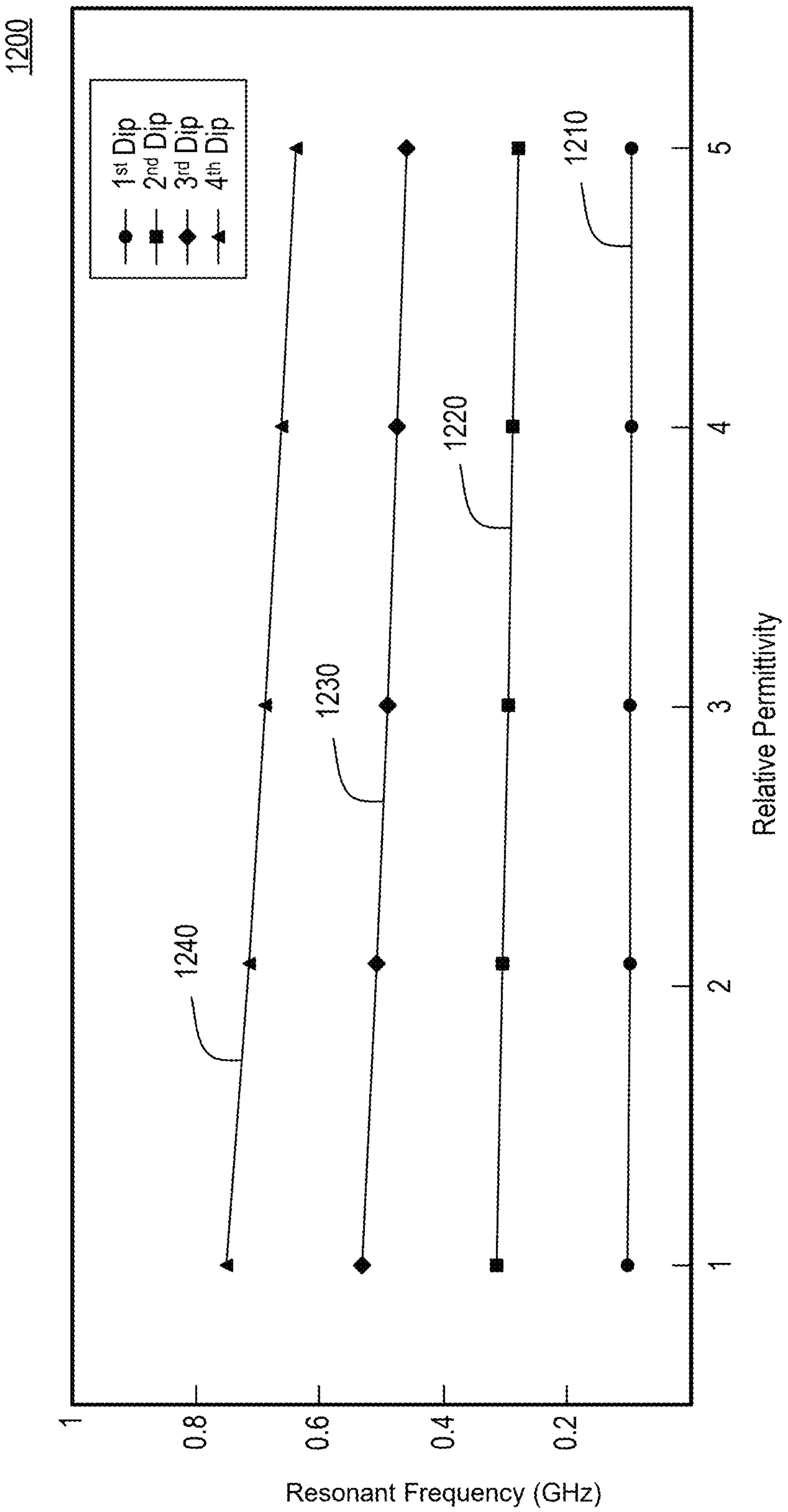
FIG. 12 is a plot of resonance frequencies of the first four resonance dips of the spiral resonator structure of FIG. 1, illustrating variations in resonance frequencies once different materials are placed as sample under test in the simulation setup of FIG. 10, in accordance with at least one example.

FIG. 12 is a plot 1200 illustrating the change in resonance frequencies along with their first four resonance dips that are generated, once various materials, having different permittivity values, are placed as sample under test 1002 nearby spiral resonator structure 100, in accordance with at least one example. Plot 1200 illustrates curves 1210, 1220, 1230, and 1240 that represent the frequency shifts 1110, 1120, 1130, and 1140, within the first, second, third, and fourth resonance dips (shown in FIG. 11), respectively. In at least one example, materials used as sample under test 1002 have permittivity values 1, 2, 3, 4, and 5. Plot 1200 illustrates that electric and magnetic fields are shielded because of ground conductor 110. As a result, shift in the resonance frequencies is minimal, and the most pronounced shift occurs in the fourth resonance dip as visible in curve 1240. In this example, the fourth resonance dip shifts from a frequency of 746 MHz to 639 MHz, a substantive change of 107 MHz, as samples under test with permittivity values of 1, 2, 3, 4, and 5 are placed nearby spiral resonator structure 100. In comparison, the shifts in $3^{rd}$, $2^{nd}$, and $1^{st}$ resonance dips are 63 MHz, 45 MHz, and 25 MHz, respectively. This confirms that the sensitivity of spiral resonator structure 100 is high, and it can easily characterize materials with these permittivity values that are placed as sample under test 1002.

Figure 13:
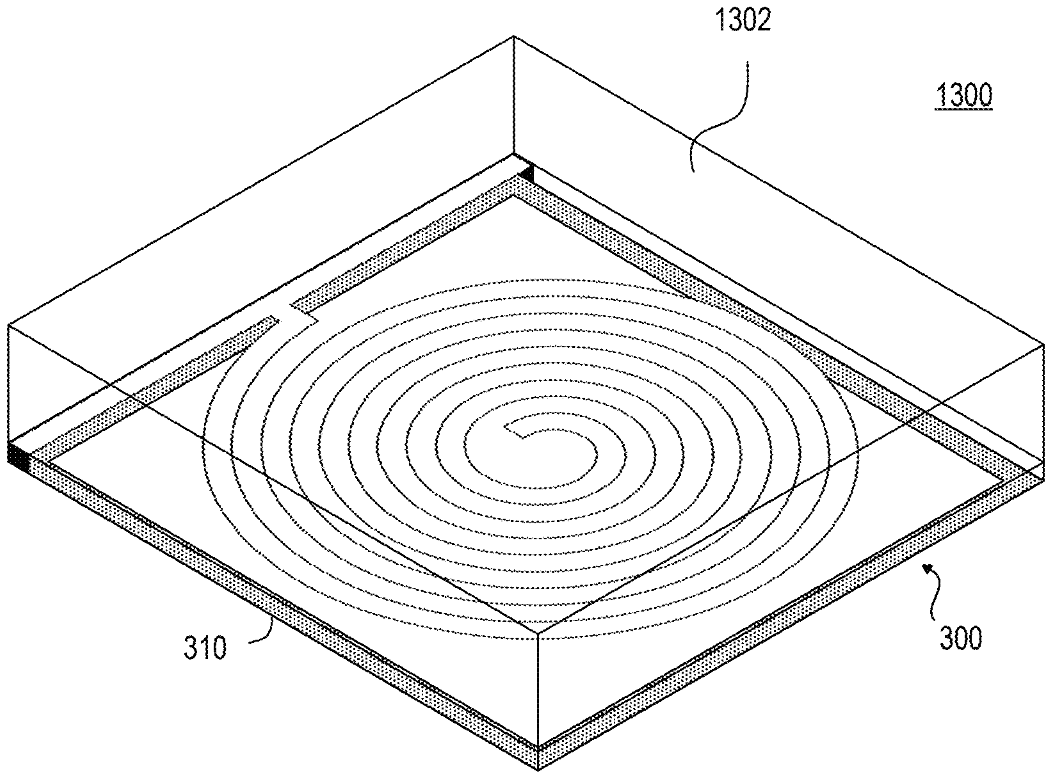
FIG. 13 is a schematic illustrating a simulation setup with a sample under test placed on an example structure of a spiral resonator material detector, in accordance with at least one example.

FIG. 13 is a schematic illustrating an apparatus 1300 in which a sample under test 1302 is placed on top of a spiral resonator structure 300, in accordance with at least one example. Spiral resonator material detector 300 exhibits better sensitivity and accuracy in determining the permittivity values of various materials placed as sample under test 1302, with different permittivity values, because of hollow ground conductor 310, which can enable larger frequency shifts in the resonance frequencies. Multiple resonance dips and strong magnetic dipole moment of spiral resonator material detector 300 enable it to accurately determine permittivity values of different materials placed as sample under test 1302, as the frequency shift in each resonance dip is dependent on the dielectric properties of sample under test 1302. The frequency shift in resonance dips can be detected by looking at the changing values of S21 scattering parameters at different resonance peaks. The frequency shifts in the resonance frequencies are greater for spiral resonator material detector 300 compared to the ones of spiral resonator structure 100, enabling accurate material characterization, which is required in industrial quality control or sensor-based material detection.

Figure 14:
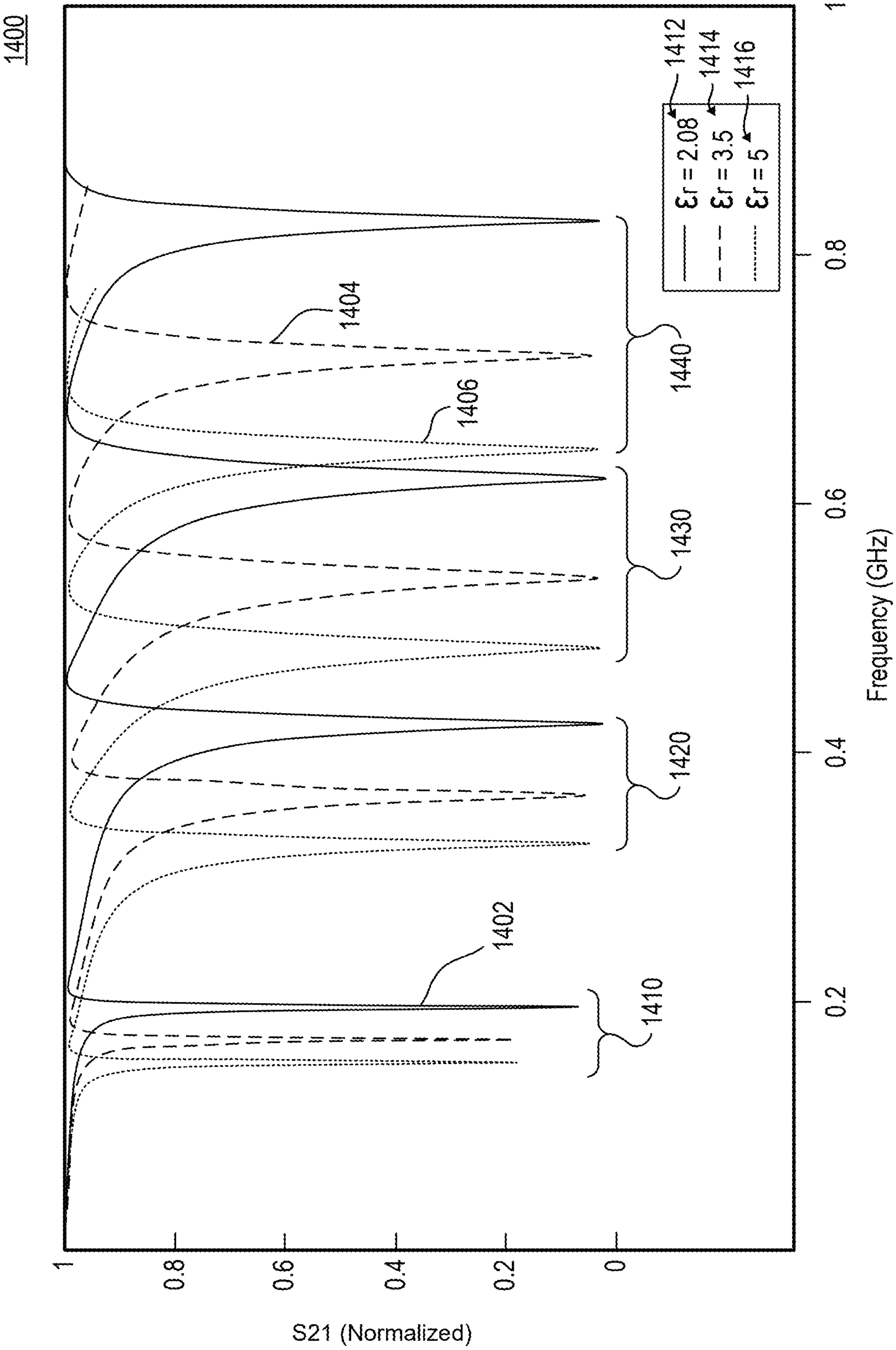
FIG. 14 is a plot of the first four resonance dips in S21 scattering parameter of the spiral resonator material detector of FIG. 13, illustrating variations in the scattering parameter once different materials are placed as sample under test in the simulation setup of FIG. 13, in accordance with at least one example.

FIG. 14 is a plot showing the variations in S21 scattering parameter of spiral resonator material detector 300 of FIG. 13 for the first four resonance dips once various materials, with different permittivity values, are placed on spiral resonator material detector 300, in accordance with at least one example. Plot 1400 has three S21 curves 1402, 1404, and 1406, illustrating the variation patterns of S21 parameter of spiral resonator material detector 300 of FIG. 13 for three materials having permittivity values 2.08, 3.5, and 5, respectively. Consequently, individual S21 curve shows the frequency shift in the resonance dips to the left. Frequency shifts in resonance dips at higher frequencies are significantly larger for materials that have larger permittivity values. As a result, sensitivity of spiral resonator material detector 300 to detect and characterize materials, having higher permittivity values, increases at resonance dips at higher frequencies. This trend is visible in resonance dip shifts 1410, 1420, 1430, and 1440, respectively.

Plot 1400 illustrates that frequency shifts of spiral resonator material detector 300 of FIG. 13 are larger for all resonance dips compared with that of spiral resonator structure 100 of FIG. 10. This phenomenon is observed because hollow ground conductor 310 of spiral resonator material detector 300 can expose the center of spiral resonator material detector 300 to stronger magnetic fields in its ambient environment, leading greater frequency shifts in the resonance frequencies on all four resonance dips. The better sensitivity to accurately determine permittivity values of materials placed as sample under test 1302 on spiral resonator material detector 300 enables it to do accurate material characterization, which is required in industrial quality control or sensor-based material detection.

Figure 15:
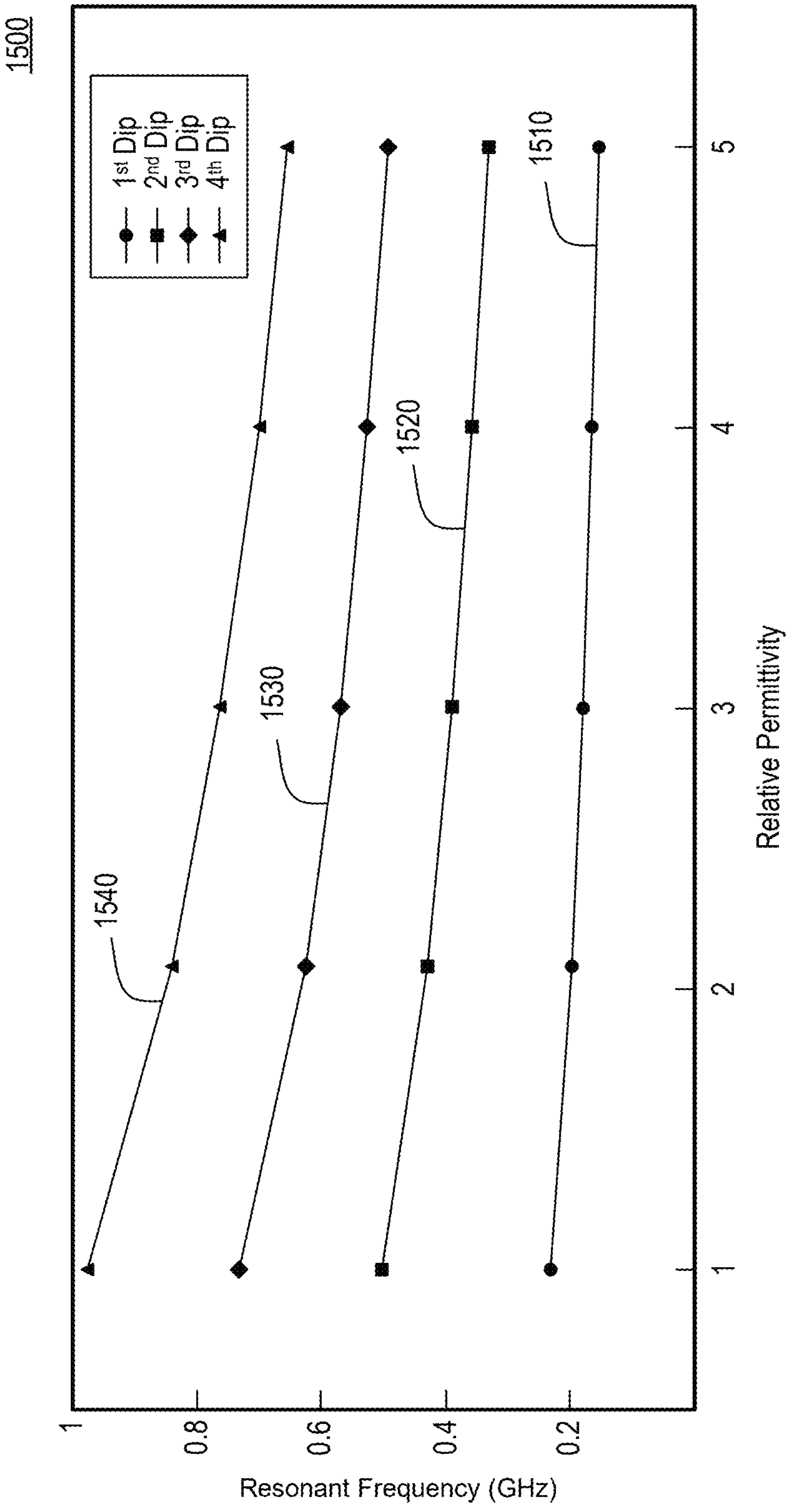
FIG. 15 is a plot of resonance frequencies of the first four resonance dips of the spiral resonator material detector of FIG. 13, illustrating variations in resonance frequencies once different materials are placed as sample under test in the simulation setup of FIG. 13, in accordance with at least one example.

FIG. 15 is a plot 1500 illustrating the change in resonance frequencies along with their first four resonance dips that are generated, once various materials, having different permittivity values, are placed as sample under test 1302 on top of spiral resonator structure 300, in accordance with at least one example. Plot 1500 illustrates curves 1510, 1520, 1530, and 1540 that represent the frequency shifts in the first, second, third, and fourth resonance dips, respectively. In at least one example, materials used as sample under test 1302 have permittivity values 1, 2, 3, 4, and 5. Plot 1500 illustrates that when magnetic fields form a strong magnetic dipole because of hollow ground conductor 310, magnetic fields penetrate deeper into sample under test 1302, causing a large shift in the resonance frequencies, and the most pronounced shift occurs in the fourth resonance dip. In curve 1540, the fourth resonance dip occurs at 0.97 GHz for a material with a permittivity value of 1, compared to 0.645 GHZ with a material of a permittivity value of 5 (a left shift of 325 MHz for the fourth resonance dip). Similarly, in curve 1530, the third resonance dip occurs at 0.723 GHz for a material with a permittivity value of 1, compared to 0.485 GHz with a material of a permittivity value of 5 (a left shift of 238 MHz for the third resonance dip). In curve 1520, the second resonance dip occurs at 0.498 GHz for a material with a permittivity value of 1, compared to 0.328 GHZ with a material of a permittivity value of 5 (a left shift of 170 MHz for the second resonance dip). In curve 1510, the first resonance dip occurs at 0.232 GHz for a material with a permittivity value of 1, compared to 0.155 GHz with a material of a permittivity value of 5 (showing the least amount of 77 MHz shift). In this example, from plot 1500, it is obvious that the frequency shifts for higher order resonance dips of spiral resonator material detector 300, especially the third and fourth ones, can more accurately characterize materials even when they have relatively smaller or subtle differences in their permittivity values. As a result, the sensitivity of spiral resonator material detector 300 is significantly higher than that of spiral resonator structure 100.

In at least one example, the improved sensitivity of spiral resonator material detector 300 may enable it to accurately characterize materials that have small differences in their permittivity values and this feature helps in characterizing concrete accurately. Different types (or grades) of concrete have different physical characteristics, especially the permittivity, due to various factors such as composition, moisture content, density, and the presence of impurities or additives (e.g., air voids, aggregates, or chemical admixtures). As the permittivity values of concrete changes because of these factors, the resonance frequencies of spiral resonator material detector 300 and corresponding resonance dips also experience a frequency shift accordingly. As a result, it is possible to do accurate and non-destructive assessment of concrete grading by measuring variations in material uniformity, moisture levels, and impurities, utilizing spiral resonator material resonator 300 for determining the quality of concrete in construction industry.

Figure 16:
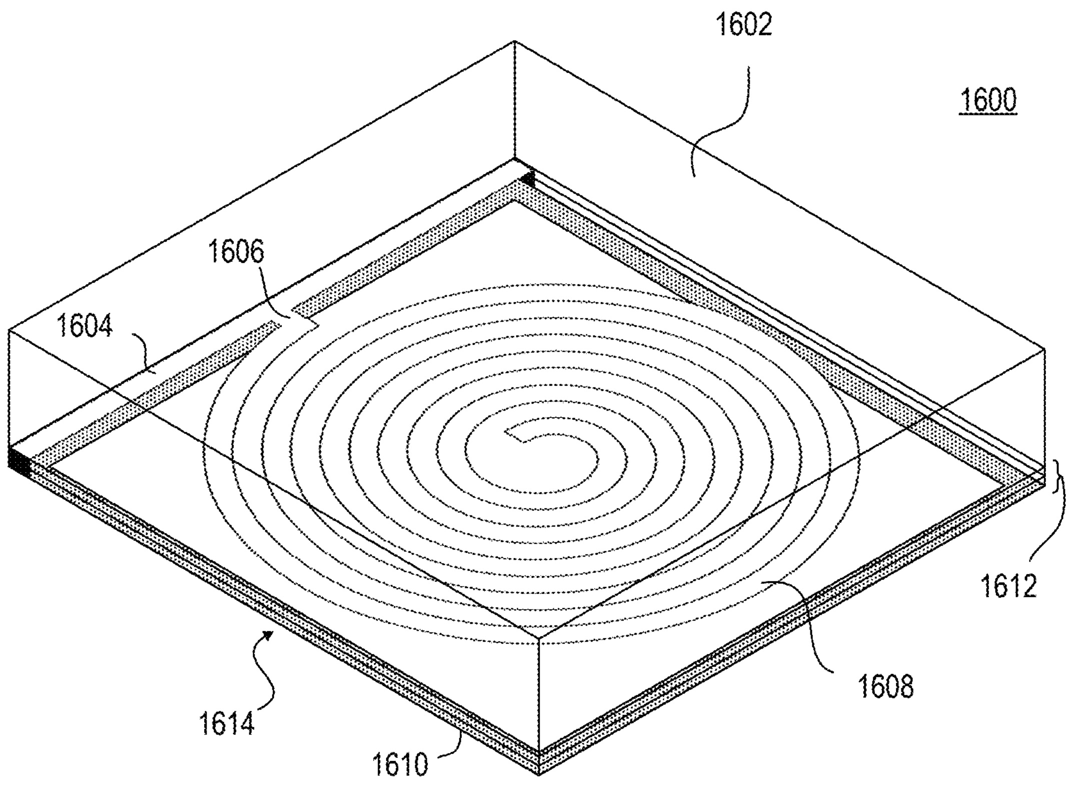
FIG. 16 is a schematic illustrating a simulation setup with a sample under test placed on an example structure of a spiral resonator material detector, featuring a dual dielectric substrate, in accordance with at least one example.

FIG. 16 is a schematic illustrating an apparatus 1600 in which a sample under test 1602 is placed on top of an example structure of a spiral resonator material detector 1614 that comprises a dual-dielectric substrate 1612, in accordance with at least one example. Spiral resonator material detector 1614 comprises a microstrip transmission line 1604, strip 1606, a spiral resonator 1608, and a hollow ground conductor 1610 like microstrip transmission line 304, strip 306, spiral resonator 308, and hollow ground conductor 310 of spiral resonator material detector 300. One design difference between the two example structures is utilizing dual-dielectric substrate 1612 instead of planar dielectric substrate 302 of FIG. 3. Dual-dielectric substrate

1612 enables freer and stronger propagation of electric and magnetic fields through spiral resonator material detector 1614, once various materials with different permittivity values are placed as sample under test 1602. This results in distinct dielectric characteristics, which eventually influence the distribution of electric and magnetic fields across spiral resonator material detector 1614. This configuration of an example spiral resonator material detector 1614 provides better sensitivity and accuracy in determining the permittivity values of various materials placed as sample under test 1602, as dual-dielectric substrate 1612, coupled with hollow ground 1610, can provide larger frequency shifts even at lower resonance dips. The frequency shifts in the resonance frequencies are larger for spiral resonator material detector 1614 compared to the ones of spiral resonator material detector 300, enabling accurate material characterization, which is required in industrial quality control or sensor-based material detection.

Figure 17:
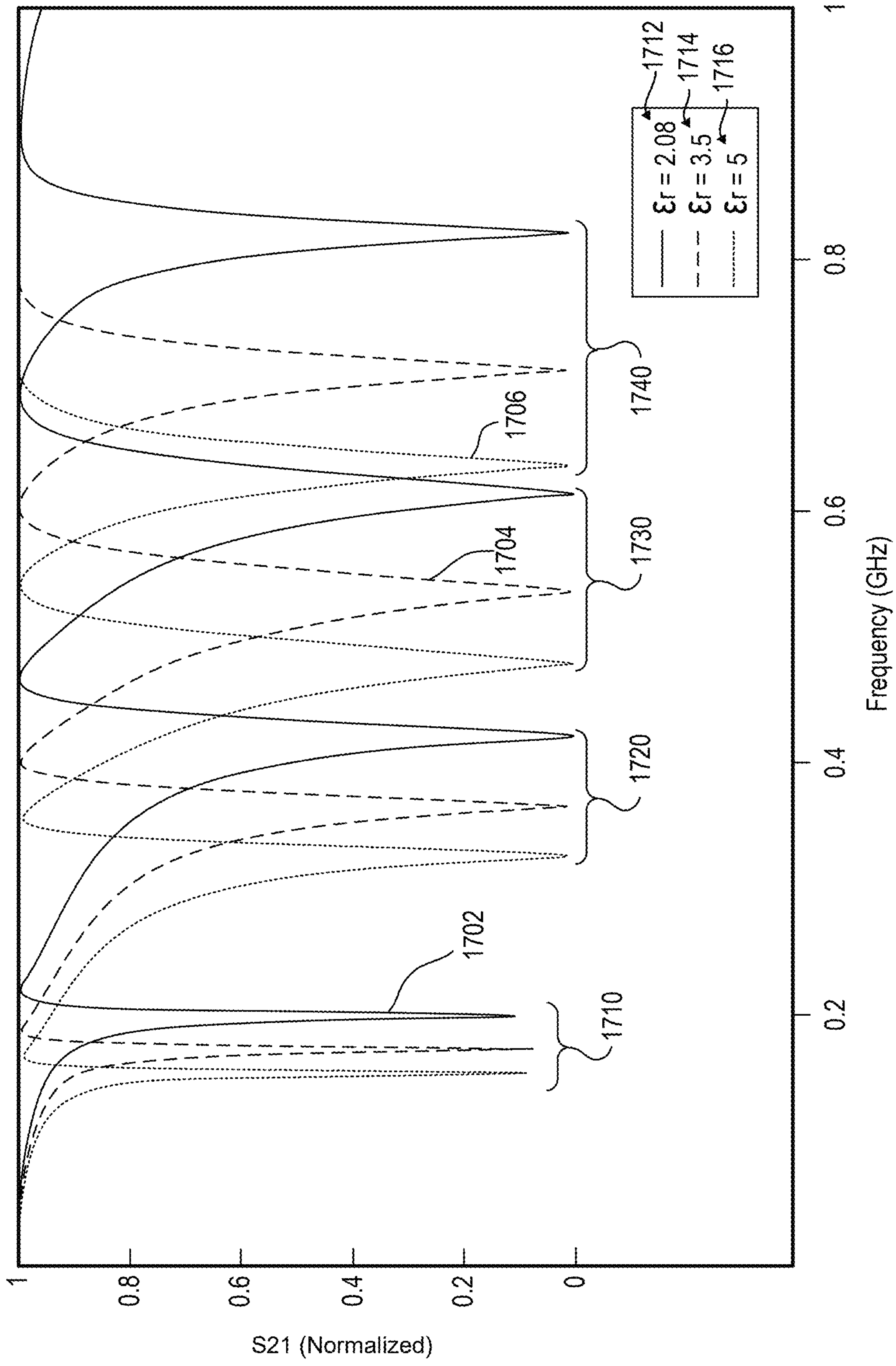
FIG. 17 is a plot of first four resonance dips in S21 scattering parameter of the spiral resonator material detector of FIG. 16, illustrating variations of the scattering parameter once different materials are placed as sample under test in the simulation setup of FIG. 16, in accordance with at least one example.

FIG. 17 is a plot 1700 illustrating the changes in resonance frequencies along with their first four resonance dips that are generated, once various materials with different permittivity values are placed as sample under test 1602 on top of a spiral resonator material detector 1614, in accordance with at least one example. Plot 1700 shows changes in normalized S21 scattering parameter of a spiral resonator material detector 1614 of FIG. 16 across first four resonance dips, when various materials with different permittivity values are placed as sample under test 1602 on spiral resonator material detector 1614. Plot 1700 illustrates three S21 curves 1702, 1704, and 1706, when three materials having permittivity values of 2.08, 3.5, and 5, respectively, are placed on spiral resonator material detector 1614. In this example detector, the relatively larger frequency shifts are observed even for the first resonance dip. For example, frequency shift 1710 in the first resonance dip can be easily observed. In comparison, frequency shifts 1720, 1730, and 1740 in the second, third, and fourth resonance dips, respectively, are significantly larger than the first resonance dip and larger than the third, fourth, and fifth resonance dips observed in FIG. 14. The reason for this is that dual-dielectric substrate 1612 can detect subtle changes in the properties of materials, effecting changes in permittivity values of materials. The larger frequency shifts in the second, third, and fourth resonance dips marked by 1720, 1730, and 1740, respectively, illustrate the effectiveness of spiral resonator material detector 1614 in accurately detecting the variations in permittivity values of three materials. The better sensitivity is due to enhanced and optimal coupling of electric and magnetic fields.

Figure 18:
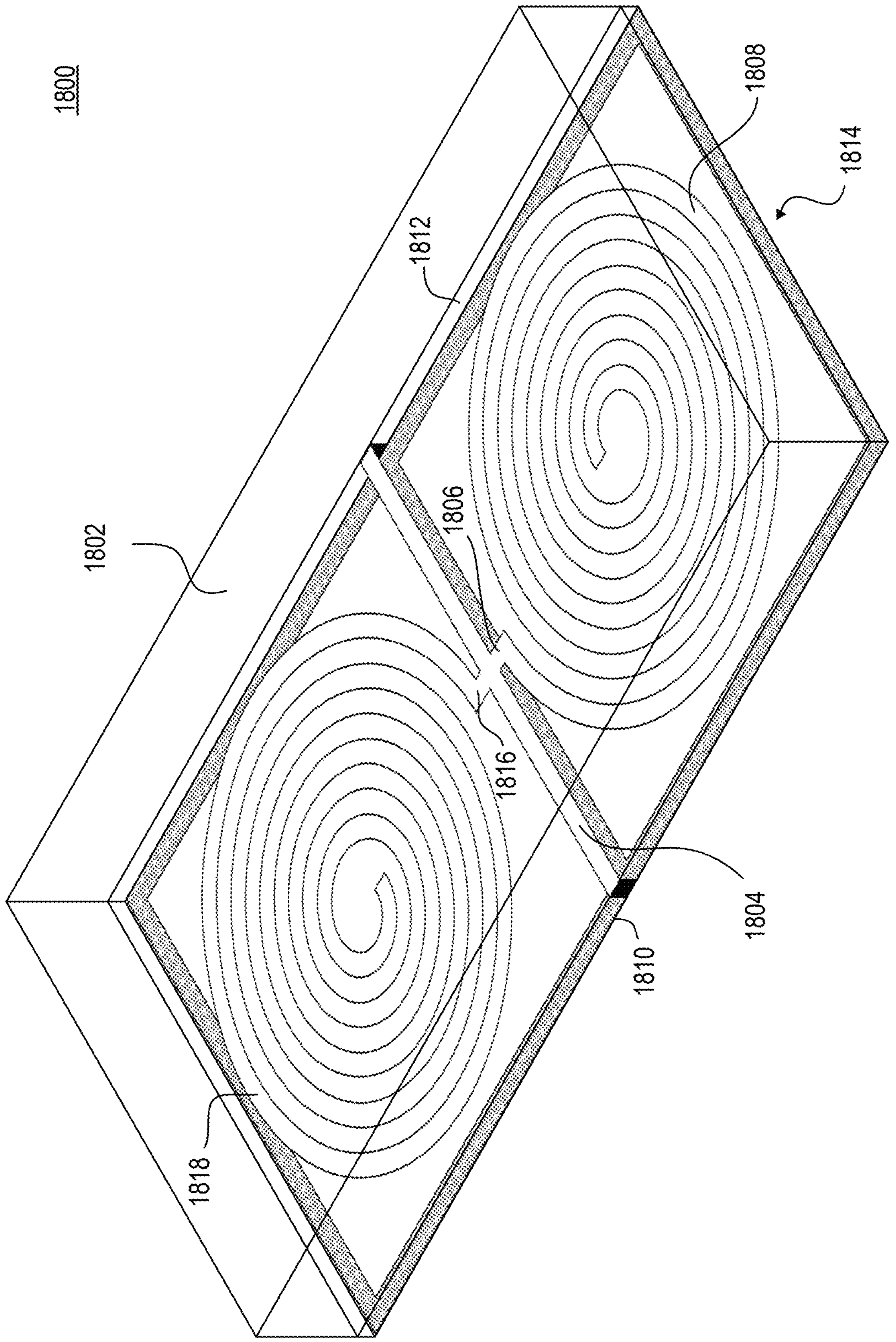
FIG. 18 is a schematic illustrating a simulation setup with a sample under test placed on an example structure of a spiral resonator material detector, featuring multiple spiral resonators, in accordance with at least one example.

FIG. 18 is schematic illustrating an apparatus 1800 in which a sample under test 1802 is placed on a spiral resonator material detector 1814 comprising two spiral resonators 1808 and 1818, in accordance with at least one example. Spiral resonator material detector 1814 comprises a microstrip transmission line 1804, a strip 1806, and a spiral resonator 1808, like that of microstrip transmission line 304, strip 306, and spiral resonator 308 of spiral resonator material detector 300 of FIG. 3. In at least one example, spiral resonator material detector 1814 includes an additional spiral resonator 1818 and a strip 1816 that connects spiral resonator 1818 to the microstrip transmission line 1804. Spiral resonator material detector 1814 includes a planar dielectric substrate 1812 that is like planar dielectric substrate 302 of spiral resonator material detector 300, but its size is larger with dimensions 50 mm×102 mm. Moreover, in spiral resonator material detector 300, hollow ground conductor 310 extends along the edges of planar dielectric substrate 302, while in comparison, hollow ground conductor 1810 extends not only along the edges of planar dielectric substrate 1812 but also beneath microstrip transmission line 1804.

In at least one example, spiral resonator 1808 and spiral resonator 1818 generate additional resonance frequencies, enhancing the overall sensitivity and accuracy of spiral resonator material detector 1814 detector in determining the permittivity values of various materials placed as sample under test 1802. Moreover, the operational frequency band of spiral resonator material detector 1814 detector is also broadened, as hollow ground conductor 1810 below two spiral resonator detectors allows stronger distribution of electric and magnetic fields around sample under test 1802. As a result, spiral resonator material detector 1814 can detect subtle changes in material characteristics (such as permittivity) of materials placed as sample under test 1802, resulting in accurate characterization of sample under test 1802.

Figure 19:
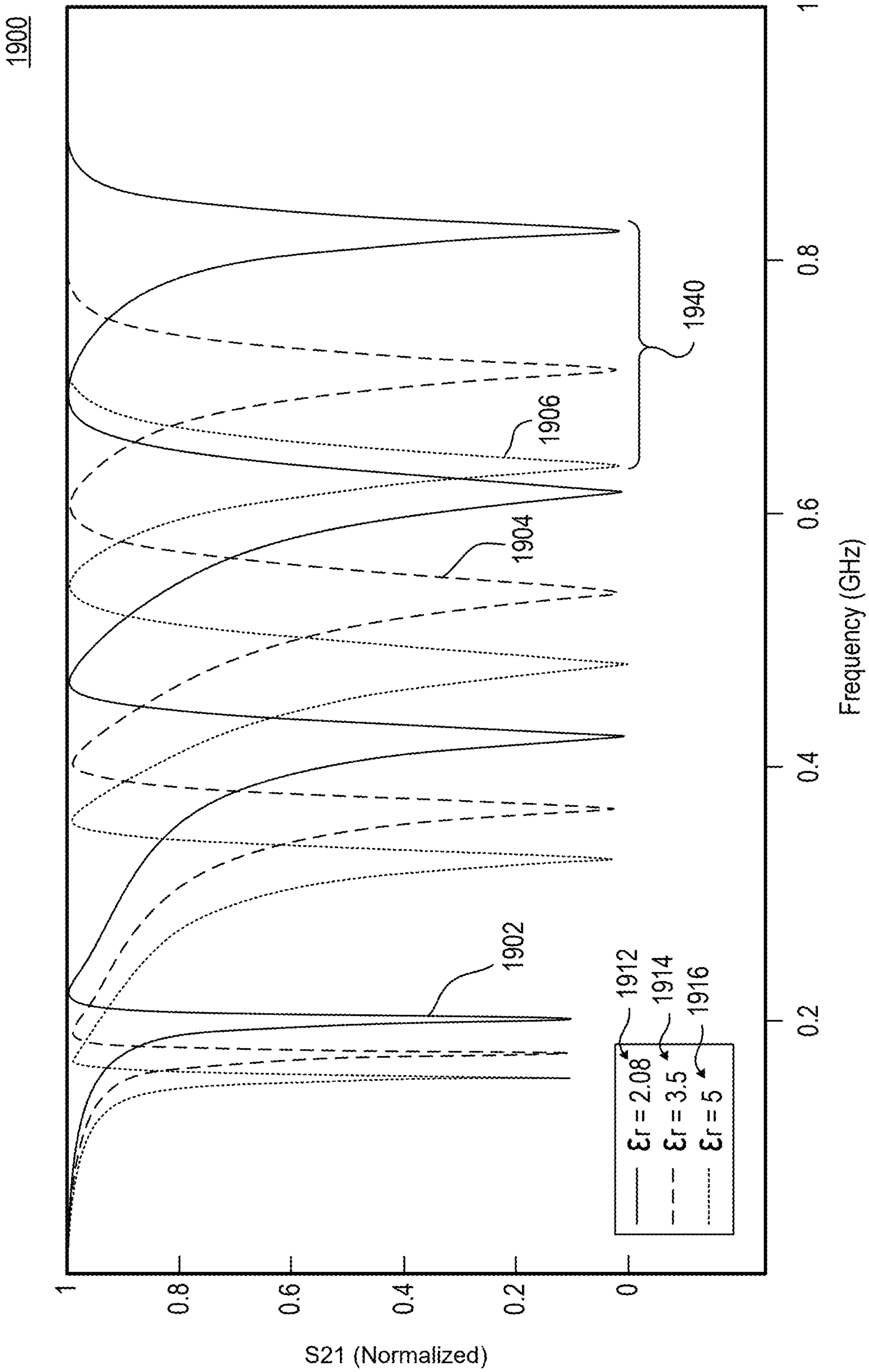
FIG. 19 is a plot of the first four resonance dips in S21 scattering parameter of the spiral resonator material detector of FIG. 18, illustrating variations in the scattering parameter once different materials are placed as sample under test in the simulation setup of FIG. 18, in accordance with at least one example.

FIG. 19 is a plot 1900 illustrating the changes in resonance frequencies, once various materials with different permittivity values are placed as sample under test 1802 on top of a spiral resonator detector 1814, in accordance with at least one example. Plot 1900 shows changes in normalized S21 scattering parameter of spiral resonator material detector 1814 of FIG. 18 across different resonance frequencies, when various materials with different permittivity values are placed as sample under test 1802 on top of a spiral resonator detector 1814. Plot 1900 shows three S21 curves, 1902, 1904, and 1906, when three materials with permittivity values of 2.08, 3.5, and 5, respectively, are placed on spiral resonator material detector 1814. Utilizing two spiral resonators, spiral resonator 1808 and spiral resonator 1818, spiral resonator material detector 1814 significantly increases its sensitivity to differentiate materials that have small differences in their permittivity values. The second spiral resonator 1818 introduces more resonance dips, providing a broader operational frequency band and enabling stronger electric and magnetic fields around sample under test 1802, in accordance with at least one example. A frequency shift 1940 of 195 MHz is observed in the fourth resonance dip, as the resonance frequency of the fourth resonance dip shifts from 0.822 GHz (shown in curve 1902) for a material with a permittivity value of 2.08 to 0.637 GHz (shown in curve 1906) for a material with a permittivity value of 5. Even though the frequency shift 1940 has not increased, plot 1900 shows that spiral resonator material detector 1814 with multiple spiral resonators can detect materials of bigger samples under test as well. In at least one example, spiral resonator 1808 and spiral resonator 1818 may be designed differently for increasing the number of resonance dips in a response of spiral resonator material detector 1814.

Figure 20:
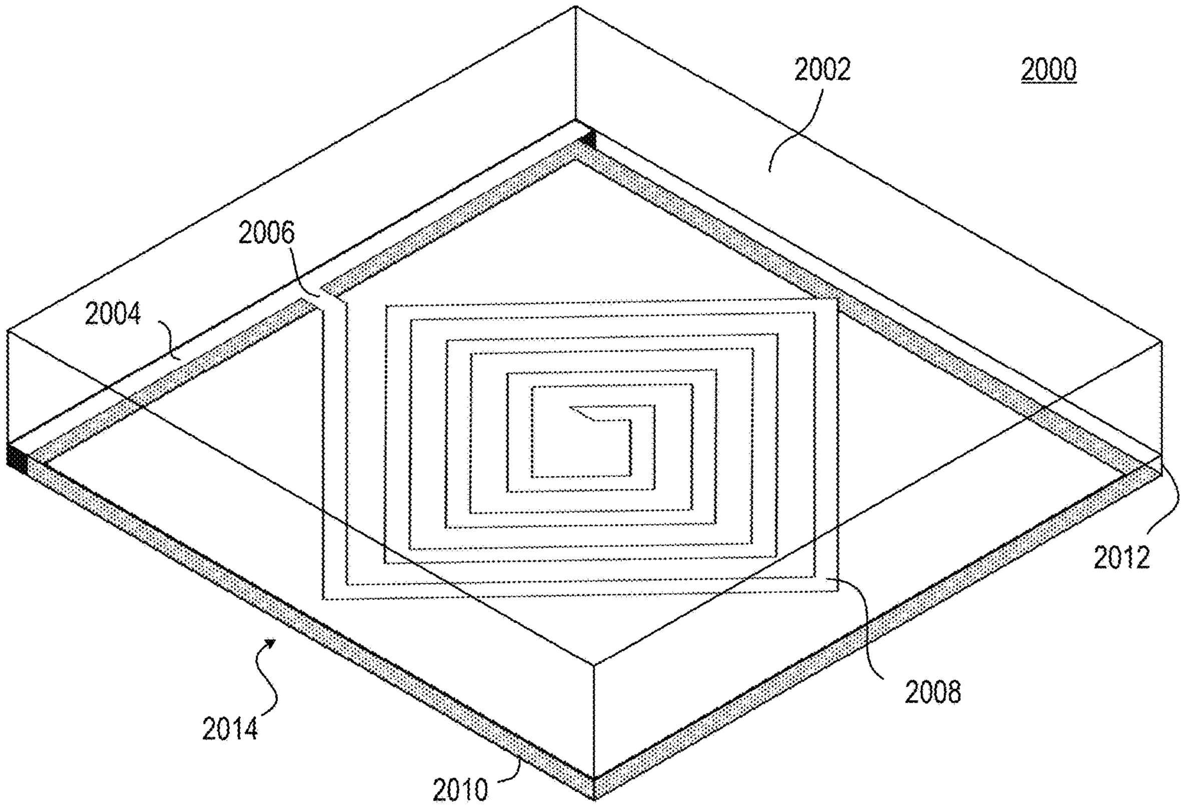
FIG. 20 is a schematic illustrating a simulation setup with a sample under test placed on an example structure of a spiral resonator material detector, featuring a rectangular spiral resonator, in accordance with at least one example.

FIG. 20 is a schematic illustrating an apparatus 2000 in which a block of sample under test 2002 is placed on a spiral resonator material detector 2014 that comprises a rectangular spiral resonator 2008, in accordance with at least one example. Spiral resonator material detector 2014 comprises a microstrip transmission line 2004, a strip 2006, a hollow ground conductor 2010, and a planar dielectric substrate 2012 that is like that of microstrip transmission line 304, strip 306, hollow ground conductor 310, and planar dielectric substrate 302 of spiral resonator material detector 300. One difference is that spiral resonator material detector 2014 comprises a rectangular spiral resonator 2008 instead of circular spiral resonator 308 of FIG. 3. In at least one example, the rectangular shape of spiral resonator 2008 helps in determining the appropriate length for electrical current and then determine the size of spiral resonator material detector 2014 to achieve desired characteristics for resonance frequencies. This structure is not only compact but also offers greater flexibility in fine tuning the sensitivity and accuracy of spiral resonator material detector 2014 to differentiate between materials having minor or subtle differences in their permittivity values.

Figure 21:
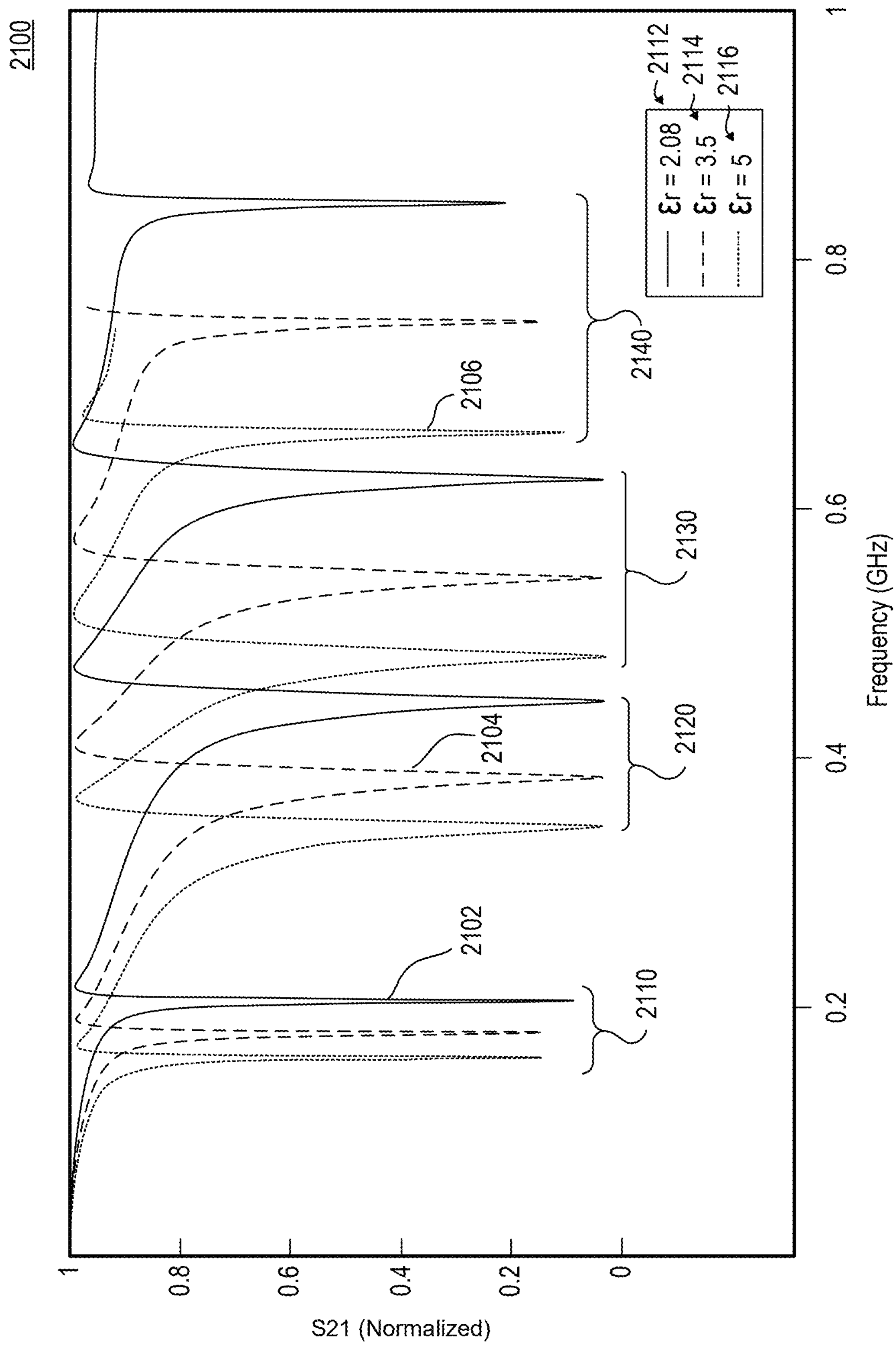
FIG. 21 is a plot of the first four resonance dips in S21 scattering parameter of a spiral resonator material detector of FIG. 20, illustrating variations in the scattering parameter once different materials are placed as sample under test in the simulation setup of FIG. 20, in accordance with at least one example.

FIG. 21 is a plot 2100 illustrating the changes in resonance frequencies of the first four resonance dips that are generated, once various materials with different permittivity values are placed as sample under test 2002 on top of a spiral resonator material detector 2014, in accordance with at least one example. Plot 2100 shows changes in normalized S21 scattering parameter of a spiral resonator material detector 2014 of FIG. 20 across first four resonance dips of resonance frequencies when various materials with different permittivity values are placed as sample under test 2002 on top of a spiral resonator detector 2014. Plot 2100 illustrates three S21 curves 2102, 2104, and 2106 when three materials having permittivity values of 2.08, 3.5, and 5, respectively, are placed on spiral resonator detector 2014. It is obvious that for this example detector, the relatively larger frequency shift is observed even for the first resonance dip. For example, frequency shift 2110 in the first resonance dip can be easily observed. In comparison, frequency shifts 2120, 2130, and 2140 in the second, third, and fourth resonance dips are not only significantly larger than the first resonance dip but also comparable to that of the third, fourth, and fifth resonance dip observed in FIG. 17. The larger frequency shifts in the third and fourth resonance dip marked by 2130 and 2140, respectively, illustrate the effectiveness of spiral resonator material detector 2014 in accurately detecting the variations in permittivity values of three materials because of better coupling of electric and magnetic fields. This shows that the shape of spiral resonator, be it circular or rectangle, may not impact the sensitivity and accuracy of a spiral resonator detector in differentiating between different materials that have difference in their permittivity values; rather the sensitivity is a function of the magnetic dipole formed due to the electric currents in spiral resonator material detector 2014.

Figure 22:
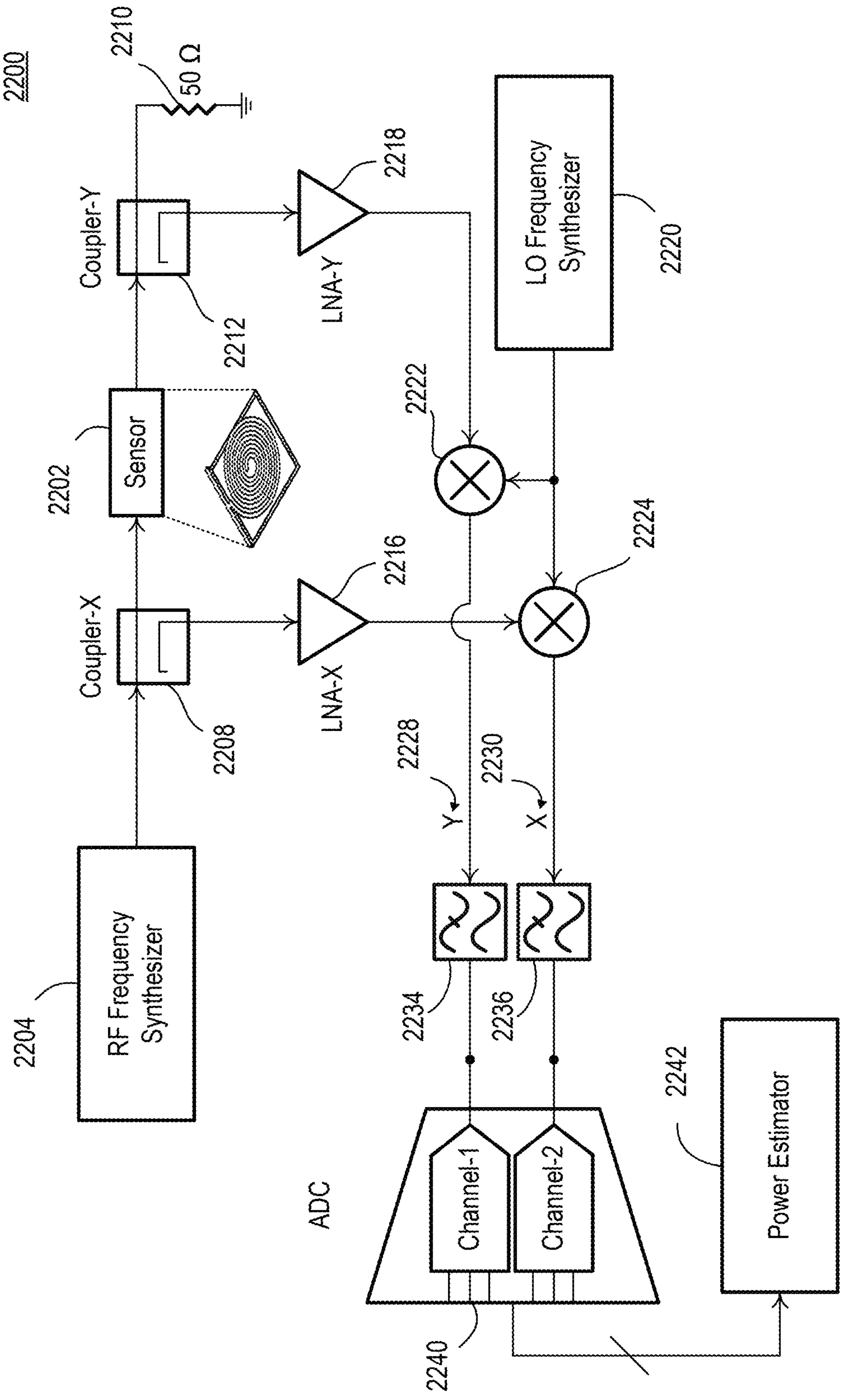
FIG. 22 is a schematic illustrating a circuit which can measure the frequency at which resonance dips occur and then use a mapping table to determine the permittivity value of a sample under test using a spiral resonator material detector, in accordance with at least one example.

FIG. 22 is a schematic illustrating a circuit 2200 that is used to determine the permittivity of a sample under test using a spiral resonator material detector 2202, in accordance with at least one example. Circuit 2200 employs an RF frequency synthesizer 2204, which generates a signal that is fed into a spiral resonator material detector 2202 after it passes through a first coupler, coupler-X 2208. Coupler-X 2208 obtains a reference signal for spiral resonator material detector 2202. The signal from spiral resonator material detector 2202 passes through a second coupler, coupler-Y 2212, that obtains the transmitted signal from spiral resonator material detector 2202. This path of circuit 2200 is terminated at a 50-Ohm terminal 2210 to match the impedance. Signals from coupler-X 2208 and coupler-Y 2212 are then amplified using low-noise amplifiers, LNA-X 2216, and LNA-Y 2218, respectively. A local oscillator (LO) frequency synthesizer 2220 generates a signal like the one generated by RF frequency synthesizer 2204, but it is shifted to the 5 MHz-which is also the intermediate frequency (IF). The outputs of LNA-X 2216 and LNA-Y 2218 are mixed with the output of LO frequency synthesizer 2220 using mixers 2222 and 2224, respectively. Mixed signals from mixers 2222 and 2224 may have unique and distinct power levels: Y 2228 and X 2230, respectively. After mixing, the signals pass through intermediate frequency (IF) filter 2234 and IF filter 2236 to isolate an upper side band signal from a lower side band signal. The lower side band signals are converted to digital signals using a two-channel analog-to-digital converter (ADC) 2240. A power estimator 2242 then processes the digital output signals from ADC 2240 to determine the values of Y 2228 and X 2230, along with their respective resonance frequencies.

$$S21 = \frac{Y}{X} \quad \text{Eq. 1}$$

In this circuit, S21 scattering parameter is calculated using Eq. 1, where Y 2228 is a signal level determined by coupler-Y 2212, and X 2230 is a signal level determined by coupler-X 2208. The scattering parameter S21 and resonance frequencies subsequently computed are used to determine the permittivity value of a sample under test by comparing the shift in the S21 scattering parameter at different resonance frequencies. In at least one example, a simple loop up in a memory map, containing the shift in the S21 scattering parameter at different resonance frequencies for different materials, is done to determine the permittivity value to subsequently characterize the material or detect deviations in the quality of material from the desired standard. In at least one example, spiral resonator material detector 2202 in circuit 2200 can represent any of the example structures of the spiral resonator material detector 2202 including spiral resonator material detectors 300, 1614, 1814, and 2014.

Figure 23:
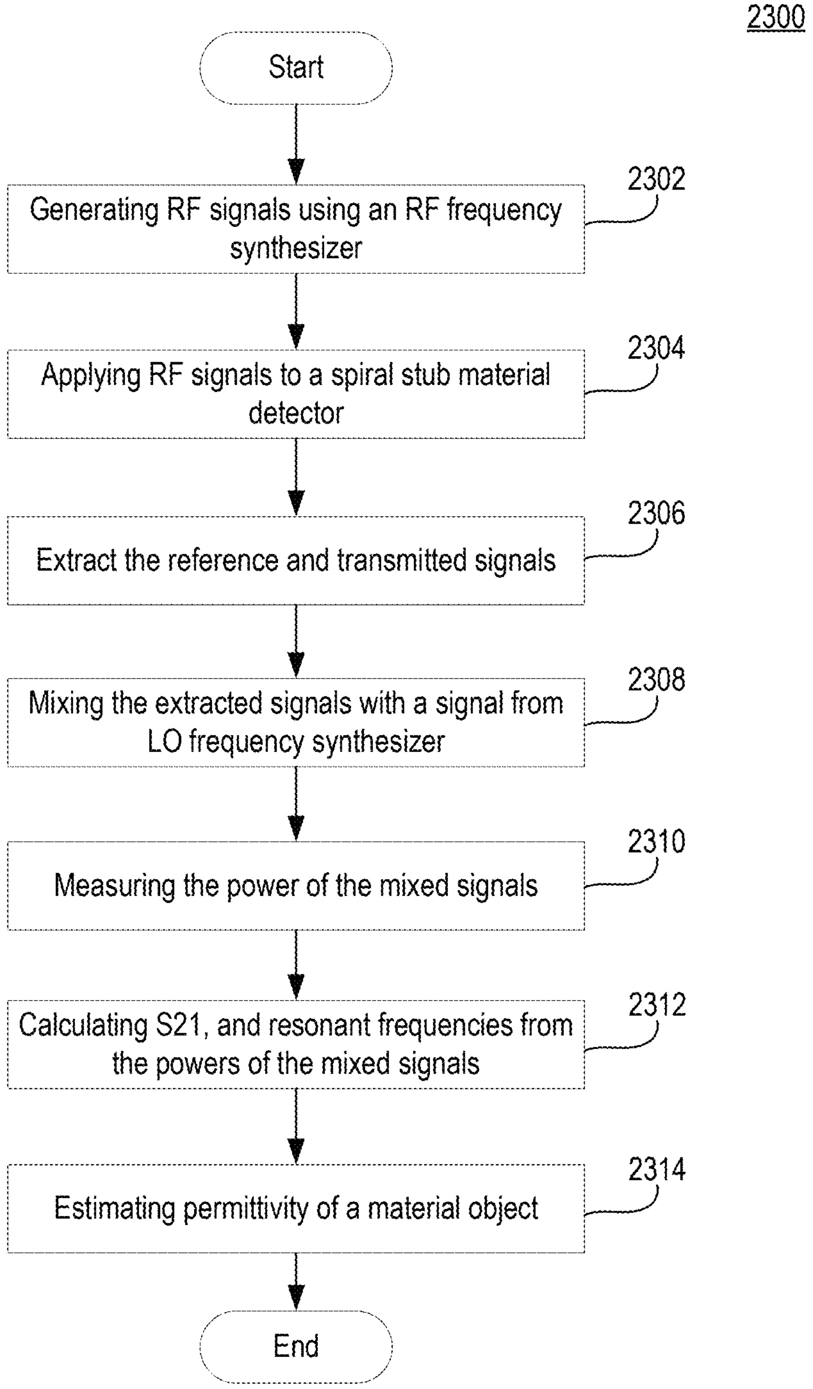
FIG. 23 is a flowchart of a method to characterize the material of a sample under test using a spiral resonator material detector, in accordance with at least one example.

FIG. 23 illustrates a flowchart depicting a method 2300 for determining the permittivity value of a sample under test using a spiral resonator material detector 2202, in accordance with at least one example. The method begins at block 2302, where RF signals are generated using RF frequency synthesizer 2204. At block 2304, the generated RF signals are applied to spiral resonator material detector 2202, whereby the currents flowing through the spiral geometry of spiral resonator induces a magnetic dipole in the spiral resonator, enabling the magnetic field to deeply penetrate the internal structures of a sample under test. The magnetic dipole interaction with the sample under test causes a shift in the scattering parameters of spiral resonator material detector 2202. At block 2306, the referenced and transmitted signals are provided by two couplers that are associated with spiral resonator material detector 2202. The reference signal is provided by the first coupler coupler-X 2208 after RF frequency synthesizer 2204 and is fed into the spiral resonator material detector 2202. Here, the transmitted signal is provided by the second coupler coupler-Y 2212 that connects a spiral resonator material detector 2202 to a 50 Ohm terminator. At block 2308, the signals provided by the couplers are mixed with a signal from LO frequency synthesizer 2220. This mixing process shifts the frequency of the signals, enabling the device to analyze the signal characteristics effectively.

At block 2310, the power of the mixed signals is measured, providing the necessary metrics for further analysis. At block 2312, the power values of the mixed signals are utilized to compute S11, S21 scattering parameters and resonance frequencies. The S21 scattering parameter is used for characterizing the response as it is significantly affected by variations in the permittivity values when the physical properties of a sample under test vary. Specifically, S21 scattering parameter is calculated by taking a ratio of the transmitted power to the incident power, providing insights into the performance of spiral resonator material detector 2202.

As shown in FIG. 11, FIG. 14, FIG. 17, FIG. 19, and FIG. 21, S21 scattering parameter and resonance frequency of a spiral resonator material detector varies as material of the sample under test with different permittivity values are placed nearby a spiral resonator material detector. Based on the value of the measured signal, the permittivity value of a material block is determined at block 2314. In at least one example a simple loop up in a memory map, containing the shift in the S21 scattering parameter at different resonance frequencies for different materials, is done to determine the permittivity value to subsequently characterize the material or detect deviations in the quality of material from the desired standard.

In at least one example, the scanning of an area of interest can be performed manually or using an automated system. In at least one example, spiral resonator material detector 2202, used in method 2300, may be one of the spiral resonator material detectors 300, 1614, 1814, 2014, or any combination thereof for a given application. In at least one example, the permittivity value of a material may be estimated by measuring a shift in the resonance frequency, changes in minimum S21 scattering parameter, or changes in the resonance frequency of a spiral resonator material detector. In at least one example, a stored table in a memory map may be used to look up resonance frequency and shifts in its resonance dips and then determine associated permittivity value of sample under test.

Figure 24:
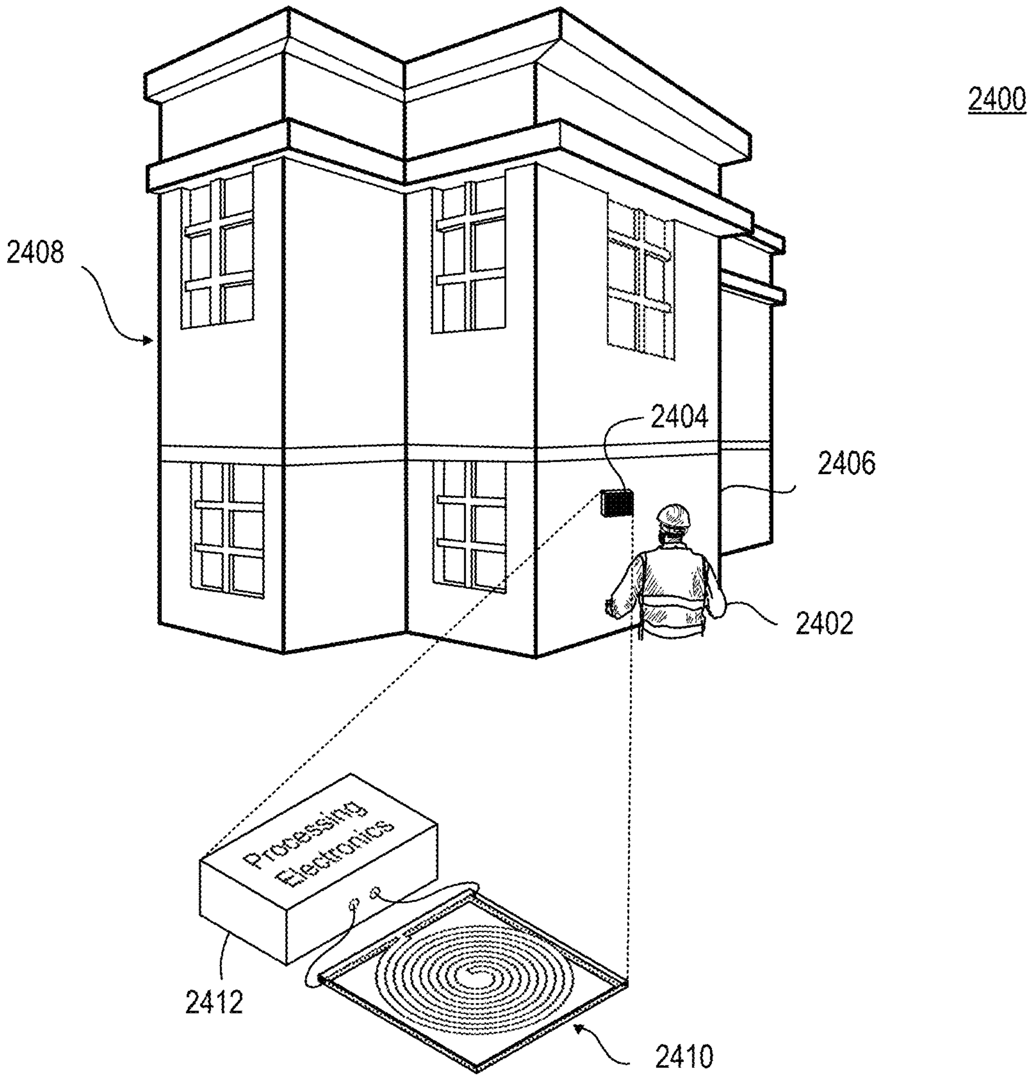
FIG. 24 is a schematic illustrating an application setup where an inspector scans a wall of a building for material characterization, particularly for grading a concrete material, in accordance with at least one example.

FIG. 24 illustrates an application scenario 2400 in which an inspector 2402 uses a handheld device 2404 to scan a wall 2406 of a building 2408 for characterization of its construction material, e.g., concrete grading, in accordance with at least one example. Handheld device 2404 is equipped with a spiral resonator material detector 2410, and its illustration is enlarged for a better understanding. Spiral resonator material detector 2410 is connected to processing electronics box 2412 housed inside handheld device 2404. Spiral resonator material detector 2410 operates by transmitting and receiving signals that interact with wall 2406, particularly the interaction of the magnetic dipole that changes the scattering parameters of spiral resonator material detector 2410. These scattering parameters are used to determine the changes in the permittivity values of the construction material, most likely concrete that is used in wall 2406. These changes in received signals are then processed by processing electronics 2412 to characterize the quality or grade of the concrete used.

Spiral resonator material detector 2410 is designed for conducting non-destructive testing, making it suitable for evaluating concrete integrity, moisture levels, and overall grading. By assessing shifts in resonance frequencies and scattering parameters of transmitted electric and magnetic signals, such as S21, spiral resonator material detector 2410 can accurately determine the permittivity value of the concrete material used in the wall, which directly depends on factors such as concrete density and moisture content. This enables inspector 2402 to quickly assess the quality or grade of the concrete used in wall 2406, by using handheld device 2404 for on-site construction quality control, monitoring, and inspections. This equipment ensures that the concrete used in buildings can be graded without the need for invasive sampling, improving the speed and accuracy, and reducing the cost of material assessment in industrial and construction applications. In at least one example, spiral resonator material detector 2410 in application 2400 can represent any of the example structures of spiral resonator material detectors 300, 1614, 1814, and 2014 or any combination thereof for determining the grade of a concrete.

Throughout specification, and in claims, "connected" may generally refer to a direct connection, such as electrical, mechanical, or magnetic connection between things that are connected, without any intermediary devices.

Unless otherwise specified use of ordinal adjectives "first, " "second," and "third," etc., to describe a common object, merely indicate that different instances of like objects are being referred to and are not intended to imply that objects so described must be in a given sequence, either temporally, spatially, in ranking or in any other manner.

Here, "sample under test" may generally refer to a physical substance or material object, such as concrete, that is placed on a spiral resonator material detector or spiral resonator structure to determine its material characteristics based on analyzing resonance dips by the spiral resonator material detector or spiral resonator structure.

Here, "spiral resonator structure" may generally refer to a resonator designed using a spiral-shaped transmission line. Spiral resonator structure may include a compact resonator that supports detection of multiple resonance dips in a frequency range.

Here, "planar dielectric substrate" may generally refer to a cuboidal, non-conductive material that separates conductive layers in electronic devices. An example of a planar dielectric substrate is Rogers RO4003, which supports the spiral resonator structure and other components.

Here, "microstrip transmission line" may generally refer to a type of electrical transmission line used to convey frequency signals where the transmission line is on top of a dielectric substrate, connecting a feedline and a spiral resonator.

Here, "strip" may generally refer to a conductive path that carries RF signals. A strip may be a conductive line that connects the microstrip transmission line to a spiral resonator allowing signal transmission in the spiral resonator.

Here, "spiral resonator" may generally refer to a transmission line terminated by an open or short circuit. A spiral resonator may include a spiral-shaped open-ended stub that contributes to resonance dips enhancing the performance of the resonator.

Here, "ground conductor" may generally refer to a conducting layer used to provide a reference voltage in electronic circuits. A ground conductor may be a layer on the bottom surface of a dielectric substrate that overlaps with a microstrip line and a feedline, affecting field distribution.

Here, "RF ports" may generally refer to points where radio frequency signals are applied or received. RF signals may be applied or received at terminals at ends of a microstrip transmission line through which RF signals are inputted into a spiral resonator structure.

Here, "resonance frequency" may generally refer to the frequency at which a system naturally oscillates with a maximum amplitude. Resonance frequency may be a frequency at which a spiral resonator structure generates resonance dips.

Here, "scattering parameter" may generally refer to a set of coefficients that describe electrical behavior of RF networks. S21 parameters may represent transmission characteristics of a spiral resonator structure across a frequency range.

Here, "normalized S21 scattering parameter" may generally refer to a S21 scattering parameter adjusted for a reference value. Normalized S21 scattering parameter may be a measurement of transmission characteristics in relation to a baseline value for spiral resonator structures.

Here, "resonance dip" may generally refer to frequencies at which a structure resonates. Resonance dip may refer to a fundamental resonance frequency that a spiral resonator structure supports or some multiples of the fundamental resonance frequency.

Here, "differential response" may generally refer to variations in a behavior or output of a system when subjected to different input conditions, such as changes in ambient environment factors or intrinsic material properties. Differential response may refer to distinct shifts in resonance dips because of variations in the values of S21 scattering parameter when various material objects with different permittivity values, are placed on a spiral resonator material detector as a sample under test.

Here, "field plot" may generally refer to a graphical representation of electric and magnetic fields in space. Field plot may refer to a graphical distribution of magnetic or electric fields around a spiral resonator structure.

Here, "magnetic field intensity" may generally refer to the strength of a magnetic field at a given point in space. Magnetic field intensity may refer to calculated magnetic field strength around a spiral resonator structure often concentrated near specific regions in the spiral resonator.

Here, "magnetic dipole" may generally refer to a pair of opposite magnetic poles created by an electric current. Magnetic dipole may refer to poles generated around a spiral resonator due to current flow within its spiral geometry.

Here, "electric field intensity" may generally refer to the force per unit charge in an electric field. Electric field intensity may refer to the strength of an electric field around a spiral resonator structure.

Here, "electrical length" may generally refer to an effective length of a transmission line or waveguide in terms of the wavelength of the signal. Electrical length may refer to the length of a spiral resonator structure relative to a wavelength of a resonance frequency it supports.

Here, "hollow ground conductor" may generally refer to a ground conductor that is not solid or fully conductive in certain areas. Hollow ground conductor may have a hollow region reducing weight or affecting field distribution beneath a spiral resonator structure.

Here, "permittivity" may generally refer to the ability of a material to store electrical energy in an electric field. Permittivity may refer to dielectric property of a material block under test, which a spiral resonator structure of some examples detects by observing shifts in resonance frequency.

Here, "symmetric field distribution" may generally refer to a balanced and even distribution of electric and magnetic fields. Symmetric field distribution may refer to a pattern of magnetic or electric fields around a spiral resonator structure, where the fields are symmetrically aligned due to the geometry of a ground conductor.

Here, "field pattern" may generally refer to a spatial distribution of an electric and magnetic field. A field pattern may refer to a specific arrangement of electric and magnetic fields around a spiral resonator structure during operation.

Here, "field strength" may generally refer to the magnitude of an electric and magnetic field at a given point. A field strength may refer to an intensity of electric or magnetic fields near a spiral resonator structure, especially at resonance frequencies.

Here, "enhanced" may generally refer to an improved or augmented feature or capability. Enhanced may refer to an improved sensitivity and accuracy of permittivity detection achieved by the spiral resonator structure.

Here, "improved" may generally refer to a superior or better version of something. Improved may refer to an optimized performance of a spiral resonator structure for detecting changes in material permittivity.

Here, "approximately" may generally refer to an estimate or value close to a certain point. Approximately may refer to values related to frequency, permittivity, or other measurements made by a spiral resonator structure, which may be subject to slight variations.

Here, "maximum magnetic field intensity" may generally refer to the highest strength of a magnetic field in a frequency band. Maximum magnetic field intensity may refer to peak magnetic field strength generated around specific parts of a spiral resonator structure.

Here, "maximum electric field intensity" may generally refer to the highest strength of an electric field in a configuration. Maximum electric field intensity may indicate peak electric field strength around a spiral resonator structure.

Here, "peak" may generally refer to the point of maximum value or performance. Peak may indicate the highest point in a scattering parameter or field strength curves, indicating resonance frequencies of a spiral resonator structure.

Here, "current distribution" may generally refer to the spread of electrical current across a conductor. Current distribution may indicate a pattern of current flowing through a spiral resonator structure at resonance frequencies.

Here, "current path" may generally refer to the route taken by electrical current through a circuit or component. A current path may indicate a specific path of current in a spiral resonator structure, which follows spiral geometry and affects resonance behavior.

Here, "permittivity detection" may generally refer to the process of determining the dielectric properties of a material. Permittivity detection may refer to a method of analyzing shifts in the resonance frequency by which the spiral resonator structure detects changes in permittivity.

Here, "concrete grading" may generally refer to the classification of concrete based on its properties such as density and strength. Concrete grading may refer to a process of determining the quality and characteristics of concrete by measuring its permittivity using a spiral resonator structure.

Here, "dielectric properties" may generally refer to electrical characteristics of a material related to its permittivity. Dielectric properties may indicate properties of a material under test that a spiral resonator structure measures by observing frequency shifts.

Here, "shift" may generally refer to a change or movement from one state to another. Shift may indicate change in transmission characteristics observed by a spiral resonator structure when detecting variations in permittivity of a material under test.

Here, "electric and magnetic field" may generally refer to the combined electric and magnetic field generated by moving charges. Electric and magnetic field may indicate a field generated in an ambient environment of a spiral resonator structure, when the field interacts with a sample material object, resulting in measurable variations in the field's characteristics including field's strength and its distribution around the sample material object.

Here, "impurities or additives" may generally refer to foreign substances or components added to a material. Impurities or additives may be components within concrete or other materials that affect quality, which a spiral resonator structure can detect by analyzing frequency shifts.

Here, “dual-dielectric substrate” may generally refer to a substrate composed of two different dielectric materials. Dual-dielectric substrate may indicate a substrate used in a spiral resonator structure design to optimize performance across different frequency bands.

Here, “rectangular spiral resonator” may generally refer to a spiral resonator with a rectangular geometry. A rectangular spiral resonator may indicate a shape of a spiral resonator used in a resonator to achieve compactness and effective permittivity detection.

Here, “multiple spiral resonators” may generally refer to more than one spiral resonator integrated into a design. Multiple spiral resonators may refer to a configuration with multiple spiral resonators to enhance the resonator’s ability to detect permittivity across a broader range of frequencies.

Here, “compact structure” may generally refer to a design that minimizes size while maintaining functionality. A compact structure may refer to a small and efficient form factor of a spiral resonator structure, which enables portable or handheld applications.

Here, “RF frequency synthesizer” may generally refer to a device that generates precise RF frequencies. RF frequency synthesizer may be used in a system to provide the signal input for a spiral resonator structure.

Here, “coupler” may generally refer to a device used to transfer energy from one circuit to another. A coupler may connect an RF frequency synthesizer to a spiral resonator structure, facilitating signal transmission.

Here, “mixer” may generally refer to a device used to combine or convert frequencies. A mixer may mix a signal from a spiral resonator structure with another signal.

Here, “LNA” may generally refer to a low-noise amplifier, LNA may be used in a system to boost weak signals from a spiral resonator structure without adding significant noise.

Here, “LO frequency synthesizer” may generally refer to a device that generates a local oscillator signal for mixing. LO frequency synthesizer may provide a reference frequency for signal mixing in the system using a spiral resonator structure.

Here, “50 Ohm termination” may generally refer to a standard impedance used in RF systems to prevent signal reflection. A 50 Ohm termination may indicate an impedance used to properly terminate a spiral resonator structure system, ensuring accurate measurements.

Here, “intermediate frequency” may generally refer to a frequency to which a signal is converted before final processing. Intermediate frequency (IF) may indicate a frequency at which signals from a spiral resonator structure are processed after mixing.

Here, “upper sideband” may generally refer to frequencies above the carrier frequency in a modulated signal. Upper sideband may indicate a sideband that is discarded when analyzing signals from a spiral resonator structure after mixing.

Here, “lower sideband” may generally refer to frequencies below a carrier frequency in a modulated signal. Lower sideband may indicate sideband of interest when analyzing signals from a spiral resonator structure.

Here, “analog-to-digital converter” generally refers to a device that converts continuous analog signals into discrete digital data. An analog-to-digital converter may convert received RF signals, which may carry information about material properties, into a digital format for further processing and analysis within a spiral resonator material detector system.

Here, “power estimator” generally refers to a component or algorithm that estimates the power level of a signal or system. A power estimator may be used to measure power of a detected RF signals to assess interaction between a spiral resonator structure or material detector and a material under test.

Here, “scattering parameters” generally refers to a mathematical representation of how RF signals are transmitted and reflected through an electrical network. Scattering parameters may refer to S-parameters like S21 (transmission) and S11 (reflection) that are used to evaluate the performance of a spiral resonator structure or material detector, including resonance frequencies and how the detector interacts with different materials.

Here, “wall testing” generally refers to a process of evaluating or inspecting the integrity or properties of a wall structure. The process of wall testing may use a spiral resonator material detector to non-destructively assess characteristics of walls, such as their concrete density or moisture content, by measuring permittivity or other electric and magnetic properties.

Here, “handheld device” generally refers to a portable, small-sized tool or instrument that can be operated by hand. A handheld device may be a compact, portable device incorporating a spiral resonator material detector, designed for on-site, non-destructive testing of materials, such as concrete walls.

Here, “processing electronics” generally refers to the electronic circuits and systems used to process signals or data. Processing electronics may handle signal conversion, analysis, and interpretation of data generated by a spiral resonator material detector, which is used to evaluate material properties like permittivity.

Here, “non-destructive testing” generally refers to a method of evaluating or inspecting materials without causing damage. Non-destructive testing may use spiral resonator material detector to measure material properties like permittivity and detect defects or impurities in concrete without physically altering or damaging the structure.

Here, “concrete density” generally refers to the mass per unit volume of a concrete material. Concrete density may indicate characteristics of a concrete material that can be measured using a spiral resonator material detector by analyzing changes in permittivity, which correlates to density of the concrete material.

Here, “moisture content” generally refers to an amount of water present in a material. Moisture content may refer to a level of water within concrete or other materials that can be detected by a spiral resonator material detector through shifts in permittivity values caused by changes in water content.

Here, “inspection” generally refers to the process of examining or evaluating a material or structure for its properties or quality. Inspection may refer to the use of a spiral resonator material detector to inspect materials like concrete for characteristics such as density, moisture content, or structural integrity during non-destructive testing.

Here, “inspector” generally refers to a person who performs assessments or evaluations of structures or materials. An inspector may refer to an individual who operates a handheld spiral resonator material detector to perform non-destructive testing of concrete or other materials for properties like density, moisture, or the presence of impurities.

In at least one embodiment, structures described herein can also be described as method(s) of forming those structures or apparatuses, and method(s) of operation of these structures or apparatuses. The following examples are provided that illustrate at least one embodiment. An example can be combined with any other example. As such, at least one example can be combined with at least another example without changing scope of an example.

Example 1 is an apparatus comprising: a planar dielectric substrate having a first surface and a second surface; a microstrip transmission line on the first surface; a spiral resonator on the first surface electrically connected to the microstrip transmission line, wherein the spiral resonator has a spiral geometry, and wherein a flow of electric current through the spiral geometry induces a magnetic dipole around the spiral resonator; a ground conductor on the second surface, wherein the planar dielectric substrate insulates the ground conductor from the microstrip transmission line and the spiral resonator.

Example 2 is an apparatus according to any examples herein, in particular example 1, wherein the spiral resonator is to resonate at one or more resonant frequencies, and wherein the one or more resonant frequencies are in microwave, millimeter wave, or terra hertz communication bands.

Example 3 is an apparatus according to any examples herein, in particular example 1, wherein a shape of the spiral geometry of the spiral resonator has one of polygonal shape, circular shape, elliptical shape, or any combination thereof.

Example 4 is an apparatus according to any examples herein, in particular example 1, wherein the planar dielectric substrate comprises one or more dielectric materials.

Example 5 is an apparatus according to any examples herein, in particular example 1, wherein the ground conductor substantially extends along all edges of the second surface of the planar dielectric substrate forming a hollow-core ground plane.

Example 6 is an apparatus according to any examples herein, in particular example 1, wherein the spiral resonator includes one or more discontinuities to modify a distribution of a flowing current within the spiral resonator.

Example 7 is an apparatus according to any examples herein, in particular example 1, wherein the first surface includes one or more spiral resonators electrically connected to the microstrip transmission line, wherein the one or more spiral resonators increase a number of resonant dips within a frequency band.

Example 8 is an apparatus comprising: a planar dielectric substrate having a first surface and a second surface; a microstrip transmission line on the first surface; a first spiral resonator on the first surface below the microstrip transmission line, wherein the first spiral resonator has a spiral geometry, wherein a flow of electric current through the spiral geometry induces a magnetic dipole around the first spiral resonator, and wherein the first spiral resonator is connected to the microstrip transmission line; a second spiral resonator on the first surface above the microstrip transmission line, wherein the second spiral resonator has a spiral geometry, wherein a flow of electric current through the spiral geometry induces a magnetic dipole around the second spiral resonator, and wherein the second spiral resonator is connected to the microstrip transmission line; and a ground conductor on the second surface, wherein the planar dielectric substrate insulates the ground conductor from the microstrip transmission line, the first spiral resonator, and the second spiral resonator.

Example 9 is an apparatus according to any examples herein, in particular example 8, wherein the first spiral resonator and the second spiral resonator are to resonate at one or more resonant frequencies, wherein the one or more resonant frequencies are in microwave, millimeter wave, or terra hertz communication bands.

Example 10 is an apparatus according to any examples herein, in particular example 8, wherein each spiral geometry of the first spiral resonator and the second spiral resonator has one of polygonal shape, circular shape, elliptical shape, or any combination thereof.

Example 11 is an apparatus according to any examples herein, in particular example 8, wherein the planar dielectric substrate comprises one or more dielectric materials.

Example 12 is an apparatus according to any examples herein, in particular example 8, wherein the first surface includes: two or more spiral resonators electrically connected to the microstrip transmission line, wherein the two or more spiral resonators increase a number of resonant dips within a frequency band.

Example 13 is an apparatus according to any examples herein, in particular example 8, wherein the ground conductor substantially overlaps the microstrip transmission line, and wherein the ground conductor is hollow beneath the first spiral resonator and the second spiral resonator.

Example 14 is an apparatus according to any examples herein, in particular example 8, wherein the ground conductor substantially extends along all edges of the second surface forming a hollow-core ground plane.

Example 15 is an apparatus according to any examples herein, in particular example 8, wherein the first spiral resonator or the second spiral resonator includes one or more discontinuities, wherein the one or more discontinuities change distribution of a flowing current within the first spiral resonator or the second spiral resonator.

Example 16 is a method of material detection using a spiral resonator material detector, the method comprising: generating a signal with a signal source; applying the signal to a microstrip transmission line; feeding the signal to a spiral resonator, wherein the spiral resonator is electrically connected to the microstrip transmission line, wherein the spiral resonator has a spiral geometry, and wherein a flow of electric current within the spiral geometry induces a magnetic dipole around the spiral resonator; receiving a plurality of signals from the microstrip transmission line; and detecting a material of a sample under test by calculating a perturbation in a power value of the plurality of signals.

Example 17 is a method according to any examples herein, in particular example 16, wherein the spiral resonator of the spiral resonator material detector has one of polygonal shape, circular shape, elliptical shape, or any combination thereof.

Example 18 is a method according to any examples herein, in particular example 16, wherein the permittivity of the sample under test is estimated by the power value of the plurality of signals received from the microstrip transmission line after the magnetic dipole interacts with the sample under test.

Example 19 is a method according to any examples herein, in particular example 16, wherein a vector network analyzer is to detect the material of the sample under test within a detection range of the spiral resonator material detector, wherein the vector network analyzer is coupled to the microstrip transmission line, wherein the detection range of the spiral resonator material detector is determined by a configuration and dimensions of the spiral resonator, and wherein the vector network analyzer is to measure scattering parameters.

Example 20 is an apparatus of a spiral resonator material detector, the apparatus comprising: a planar dielectric substrate; a microstrip transmission line on a first surface of the planar dielectric substrate; one or more spiral resonators on the first surface of the planar dielectric substrate substantially below the microstrip transmission line, wherein the one or more spiral resonators are electrically connected to the microstrip transmission line; and a ground conductor on a second surface of the planar dielectric substrate, wherein the planar dielectric substrate insulates the ground conductor from the microstrip transmission line and the one or more spiral resonators.

Example 21 is an apparatus according to any examples herein, in particular example 20, wherein the individual spiral resonator is to resonate at one or more resonant frequencies, and wherein the one or more resonant frequencies are in microwave, millimeter wave, or terra hertz communication bands.

Example 22 is an apparatus according to any examples herein, in particular example 20, wherein a spiral of the individual spiral resonator has one of: polygonal shape; circular shape; elliptical shape; or any combination thereof.

Example 23 is an apparatus according to any examples herein, in particular example 20, wherein the planar dielectric substrate comprises one or more dielectric materials.

Example 24 is an apparatus according to any examples herein, in particular example 20, wherein the ground conductor substantially extends along all edges of the second surface of the planar dielectric substrate forming a continuous thin strip.

Example 25 is a method of material permittivity detection using a spiral resonator material detector, the method comprising: generating a signal with a vector network analyzer; applying the signal to a microstrip transmission line; feeding the signal to a spiral resonator, wherein the spiral resonator is electrically connected to the microstrip transmission line; receiving a signal from the microstrip transmission line using the vector network analyzer; and estimating a permittivity of a sample under test by calculating a perturbation in the scattering parameter.

Example 26 is a method according to any examples herein, in particular example 25, wherein the spiral resonator is to resonate at a resonant frequency, and wherein the resonant frequency is in the frequency sweep of the vector network analyzer.

Example 27 is a method according to any examples herein, in particular example 25, wherein the spiral resonator of the spiral resonator material detector has one of polygonal shape, circular shape, elliptical shape, or any combination thereof.

Example 28 is a method according to any examples herein, in particular example 25, wherein the permittivity of the sample under test is detected by the power value of the plurality of signals received from the microstrip transmission line.

Example 29 is an apparatus of spiral resonator structure, wherein a planar dielectric substrate is of Rogers RO4003 printed circuit board, which has a dielectric constant of approximately 3.55 and a thickness of 0.5 millimeters.

What is claimed is:

1. An apparatus comprising:

a planar dielectric substrate having a first surface and a second surface;

a microstrip transmission line on the first surface;

a spiral resonator on the first surface electrically coupled to the microstrip transmission line, wherein the spiral resonator has a spiral geometry; and a ground conductor on the second surface, wherein the planar dielectric substrate is to insulate the ground conductor from the microstrip transmission line and the spiral resonator, wherein the ground conductor extends along edges of the second surface of the planar dielectric substrate forming a hollow-core ground plane.

2. The apparatus of claim 1, wherein the spiral resonator is to resonate at one or more resonant frequencies, and wherein the one or more resonant frequencies are in microwave, millimeter wave, or terra hertz communication bands.

3. The apparatus of claim 1, wherein a shape of the spiral geometry of the spiral resonator has one of polygonal shape, circular shape, elliptical shape, or any combination thereof.

4. The apparatus of claim 1, wherein the planar dielectric substrate comprises one or more dielectric materials.

5. The apparatus of claim 1, wherein the spiral resonator includes one or more discontinuities to modify a distribution of a flowing current within the spiral resonator.

6. The apparatus of claim 1, wherein the first surface includes one or more spiral resonators electrically connected to the microstrip transmission line.

7. The apparatus of claim 6, wherein a flow of electric current through the spiral geometry induces a magnetic dipole in the spiral resonator, wherein the one or more spiral resonators increase number of resonant dips within a frequency band.

8. An apparatus comprising:

a planar dielectric substrate having a first surface and a second surface;

a microstrip transmission line on the first surface;

a first spiral resonator on the first surface below the microstrip transmission line, wherein the first spiral resonator has a spiral geometry, and wherein the first spiral resonator is connected to the microstrip transmission line;

a second spiral resonator on the first surface above the microstrip transmission line, wherein the second spiral resonator has a spiral geometry, and wherein the second spiral resonator is connected to the microstrip transmission line; and a ground conductor on the second surface, wherein the planar dielectric substrate is configured to insulate the ground conductor from the microstrip transmission line, the first spiral resonator, and the second spiral resonator, wherein the ground conductor extends along all edges of the second surface forming a hollow-core ground plane.

9. The apparatus of claim 8, wherein a flow of electric current through the spiral geometry induces a first magnetic dipole in the first spiral resonator, wherein a flow of electric current through the spiral geometry induces a second magnetic dipole in the second spiral resonator.

10. The apparatus of claim 8, wherein the first spiral resonator and the second spiral resonator are to resonate at one or more resonant frequencies, wherein the one or more resonant frequencies are in microwave, millimeter wave, or terra hertz communication bands.

11. The apparatus of claim 8, wherein an individual spiral geometry of the first spiral resonator and the second spiral resonator has one of polygonal shape, circular shape, elliptical shape, or any combination thereof.

12. The apparatus of claim 8, wherein the first surface includes: two or more spiral resonators electrically connected to the microstrip transmission line, wherein the two or more spiral resonators increase number of resonant dips within a frequency band.

13. The apparatus of claim 8, wherein the ground conductor overlaps the microstrip transmission line, and wherein the ground conductor is hollow beneath the first spiral resonator and the second spiral resonator.

14. The apparatus of claim 8, wherein the first spiral resonator or the second spiral resonator includes one or more discontinuities, wherein the one or more discontinuities changes distribution of a flowing current within the first spiral resonator or the second spiral resonator.

* * * * *